US012665960B2

(12) United States Patent
Park et al.

(10) Patent No.: US 12,665,960 B2
(45) Date of Patent: Jun. 23, 2026

(54) FLEXIBLE DISPLAY DEVICE

(71) Applicant: LG ELECTRONICS INC., Seoul (KR)

(72) Inventors: Jin Woo Park, Seoul (KR); Ara Kim, Seoul (KR); Hang Seok Kim, Seoul (KR); Min Chul Shin, Seoul (KR); Sung Lyong Cha, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 734 days.

(21) Appl. No.: 17/917,340

(22) PCT Filed: Apr. 10, 2020

(86) PCT No.: PCT/KR2020/004916
§ 371 (c)(1),
(2) Date: Oct. 6, 2022

(87) PCT Pub. No.: WO2021/206203
PCT Pub. Date: Oct. 14, 2021

(65) Prior Publication Data
US 2023/0164248 A1 May 25, 2023

(51) Int. Cl.
*H04M 1/02* (2006.01)
*G06F 1/16* (2006.01)

(52) U.S. Cl.
CPC ............ *H04M 1/0237* (2013.01); *G06F 1/16* (2013.01); *G06F 1/1624* (2013.01);
(Continued)

(58) Field of Classification Search
CPC ............. H04M 1/0237; H04M 1/0268; H04M 2201/08; H04M 2201/38; H04M 1/0235;
(Continued)

(56) References Cited

U.S. PATENT DOCUMENTS

| | | | |
|---|---|---|---|
| 2017/0142848 A1* | 5/2017 | Yeo ...................... | H05K 5/0217 |
| 2019/0268455 A1* | 8/2019 | Baek ..................... | G06F 1/1652 |
| 2020/0120814 A1* | 4/2020 | Huang .................... | H05K 5/03 |

FOREIGN PATENT DOCUMENTS

| | | |
|---|---|---|
| KR | 10-2010-0121970 A | 11/2010 |
| KR | 10-1107127 B1 | 1/2012 |

(Continued)

*Primary Examiner* — Nam T Huynh
(74) *Attorney, Agent, or Firm* — Birch, Stewart, Kolasch & Birch, LLP

(57) ABSTRACT

A flexible display device is disclosed. The flexible display device includes a first body, a second body that moves in a first direction with respect to the first body, and a flexible display that varies according to the movement of the second body. Either one of the first body and the second body has coupled thereto a plurality of spherical rolling balls arranged in the first direction, and the other one has formed therein rolling grooves, in the form of concave grooves having a constant cross-section, in the first direction to allow the rolling balls to move in contact with same. In embodiments of the present invention, the movement of the second body is facilitated by a point contact of the rolling balls and the rolling grooves, and external exposure of an element for slidable movement of the second body may be minimized.

18 Claims, 20 Drawing Sheets

(52) U.S. Cl.
    CPC ........ G06F 1/1652 (2013.01); H04M 1/0268
                (2013.01); *H04M 2201/08* (2013.01); *H04M*
                                      *2201/38* (2013.01)

(58) Field of Classification Search
    CPC ........ G06F 1/16; G06F 1/1624; G06F 1/1652;
                G06F 1/1681; G06F 2203/04102; G06F
                    1/1616; G06F 1/1641; G06F 1/1637;
                                                G09F 9/30
    See application file for complete search history.

(56)                      References Cited

FOREIGN PATENT DOCUMENTS

| KR | 10-2017-0056771 | A | 5/2017 |
| KR | 10-2018-0012904 | A | 2/2018 |
| KR | 10-2019-0101605 | A | 9/2019 |
| KR | 10-2020-0007510 | A | 1/2020 |
| KR | 10-2020-0013821 | A | 2/2020 |

* cited by examiner

[FIG. 1]
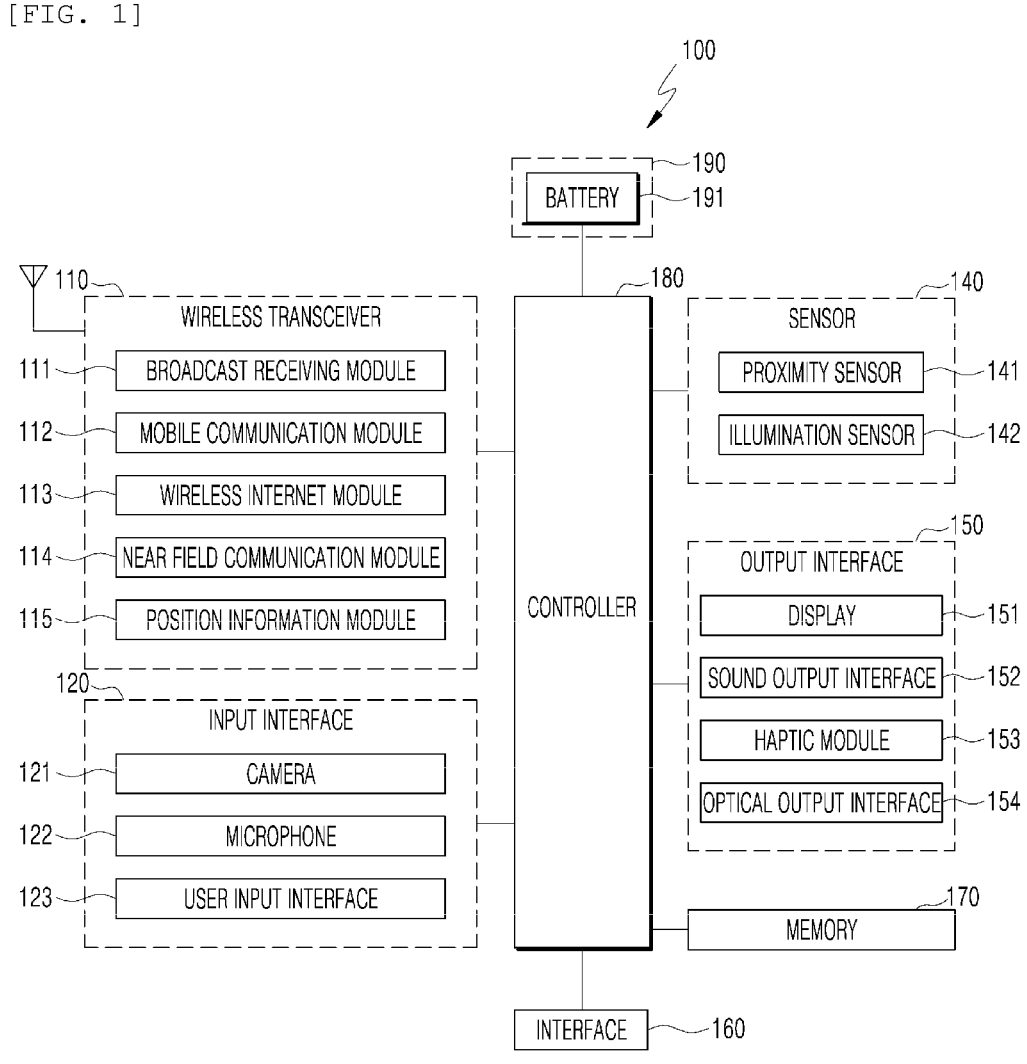

[FIG. 2A]
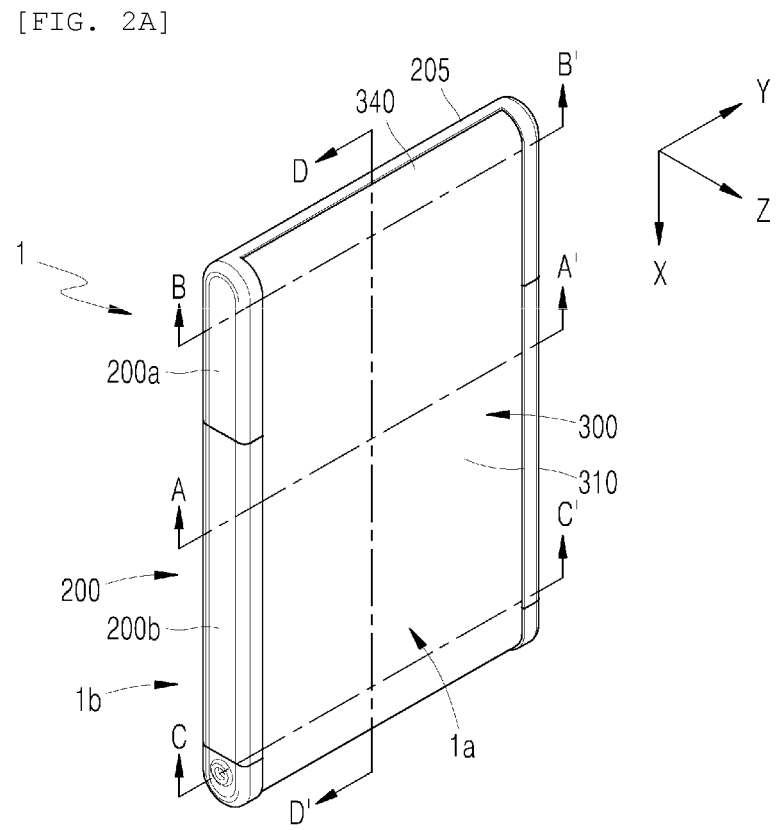

[FIG. 2B]
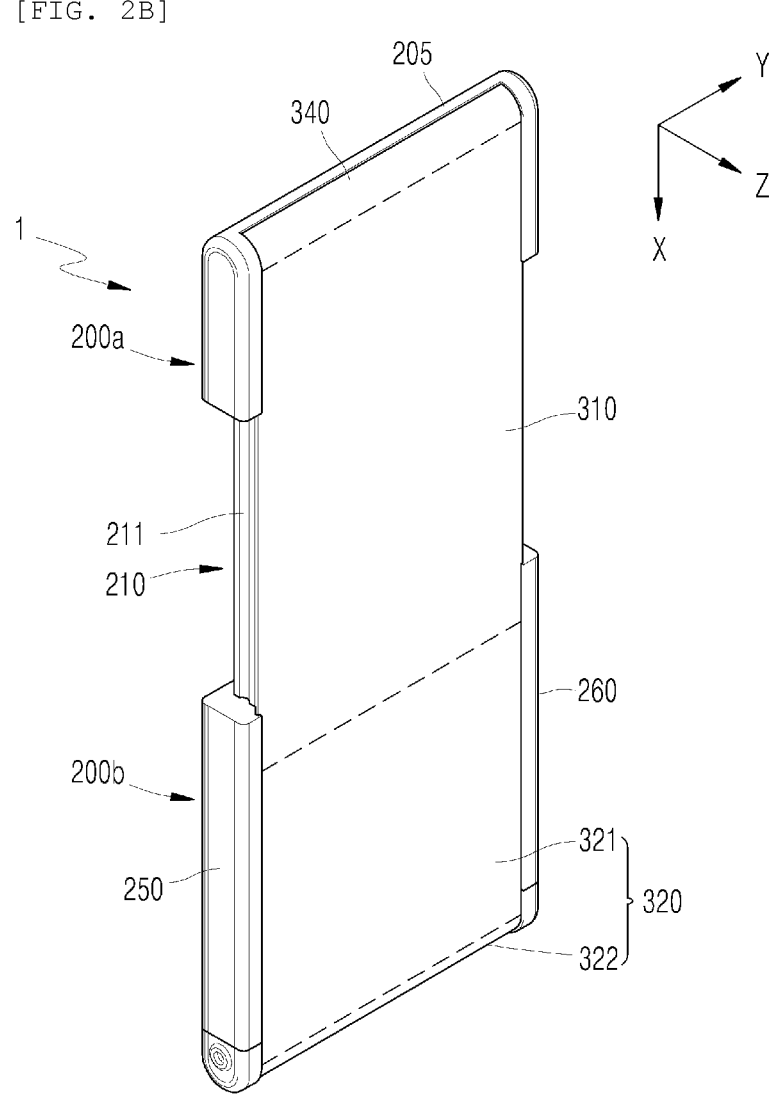

[FIG. 3A]
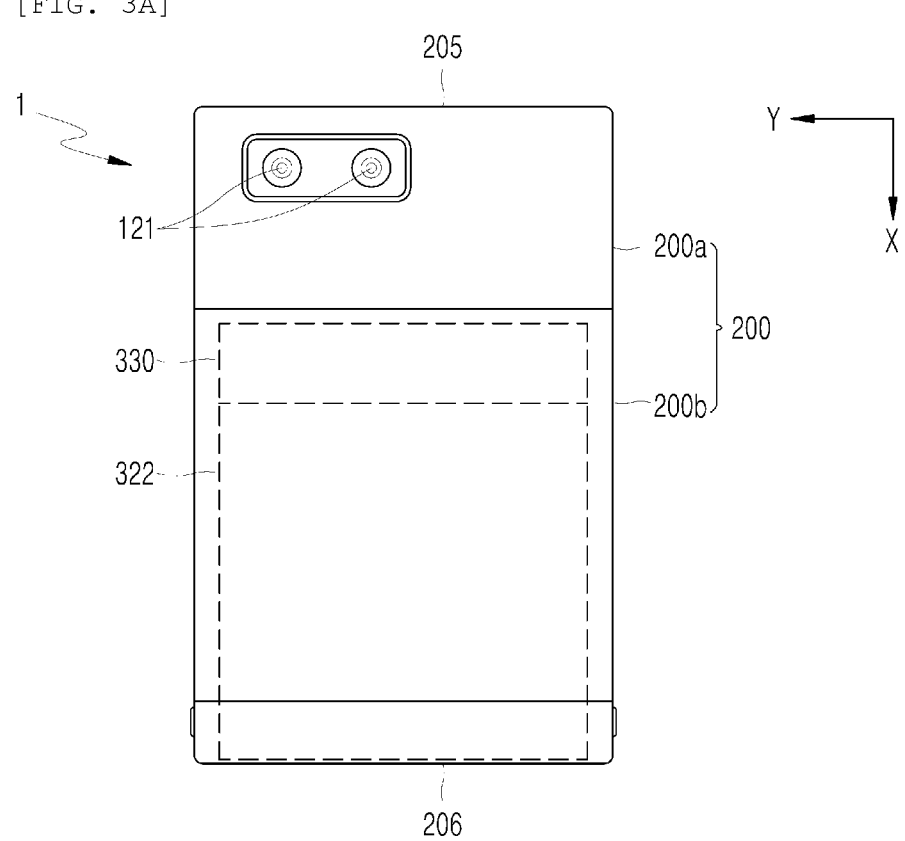

[FIG. 3B]
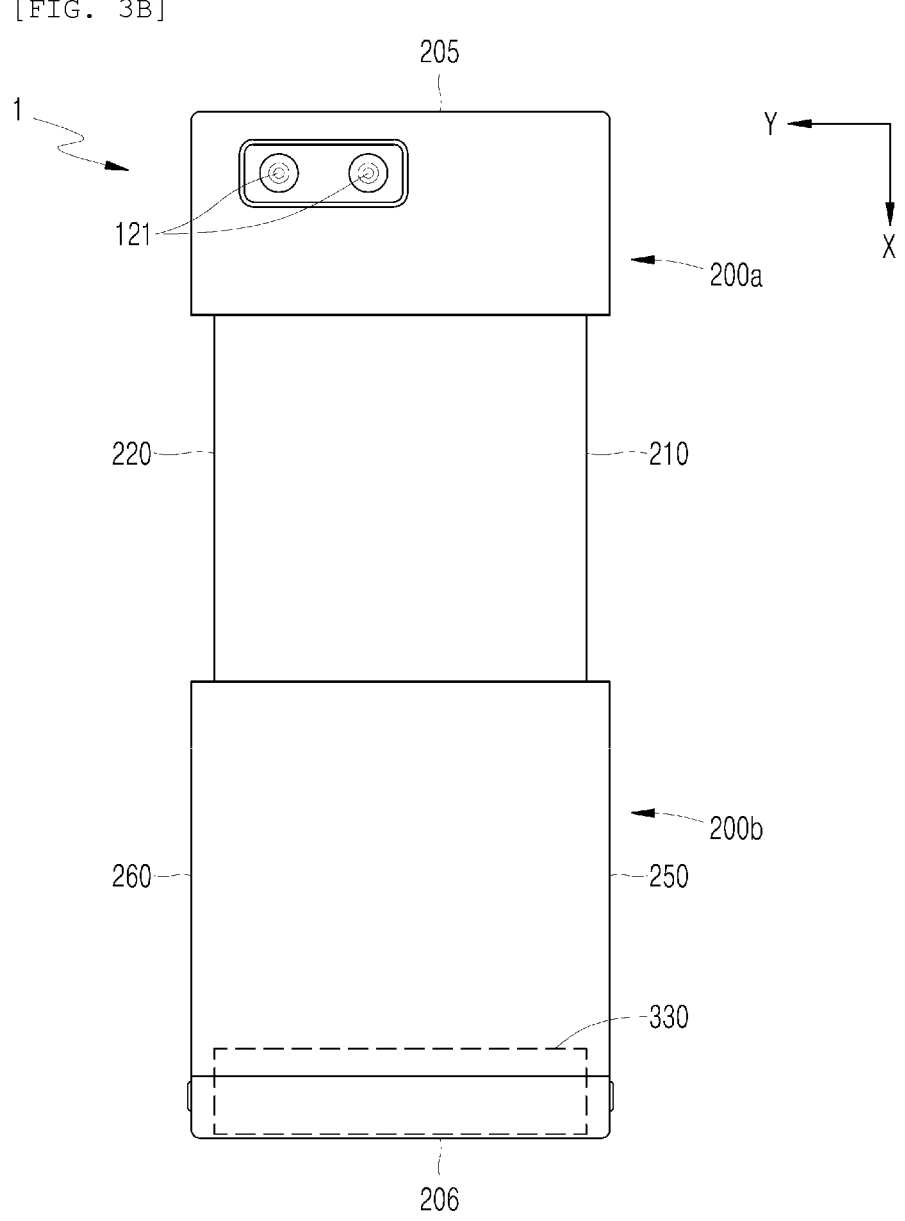

[FIG. 4A]
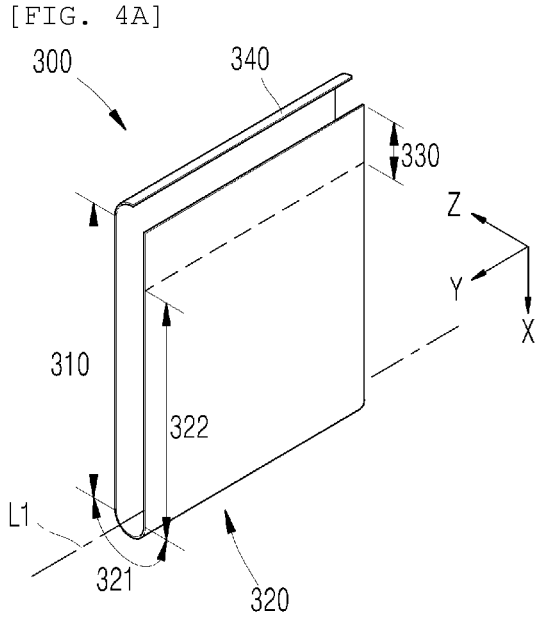
[FIG. 4B]
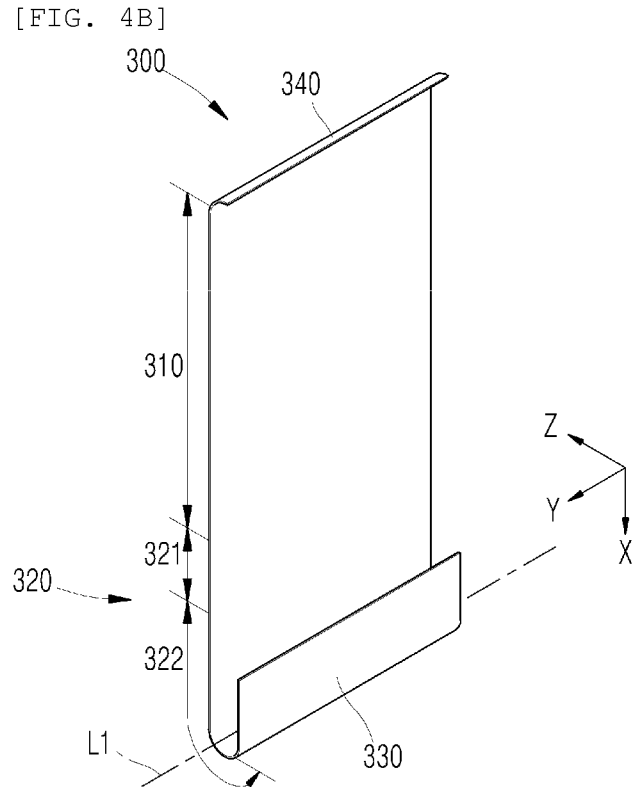

[FIG. 5A]
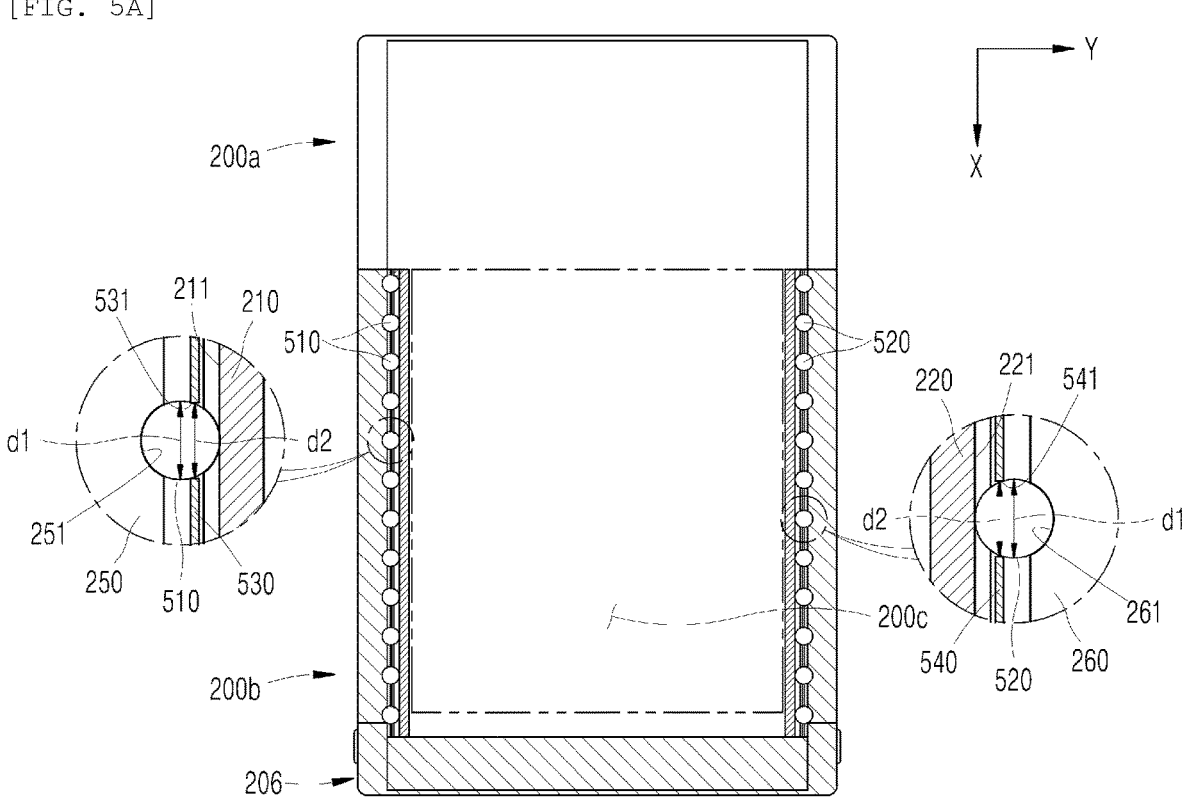

[FIG. 5B]
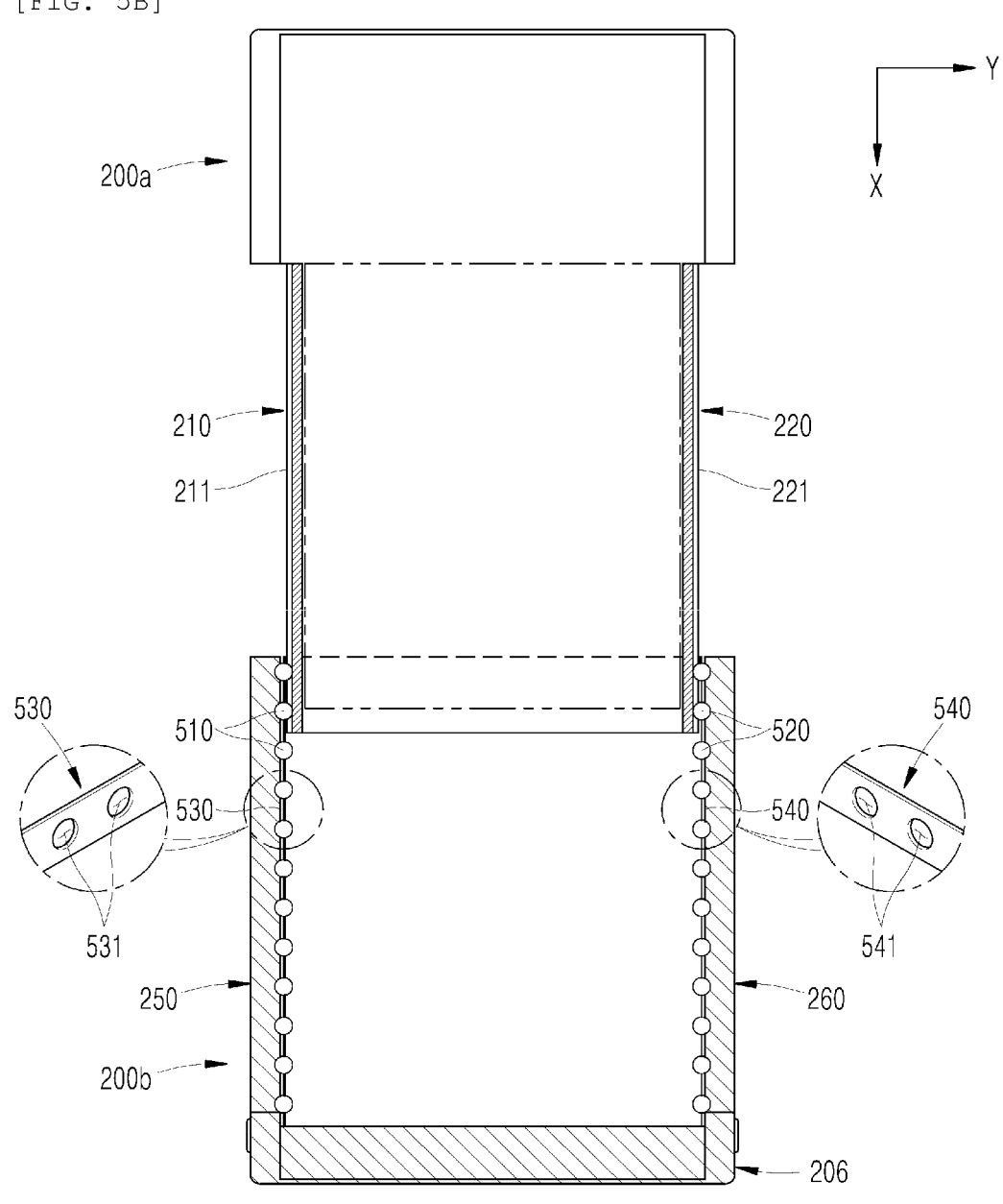

[FIG. 6]
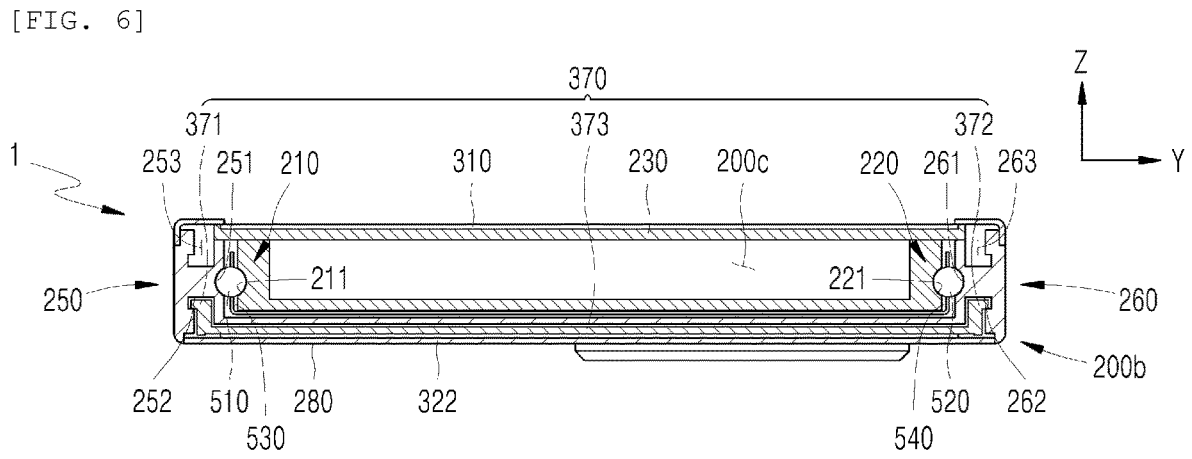
[FIG. 7A]
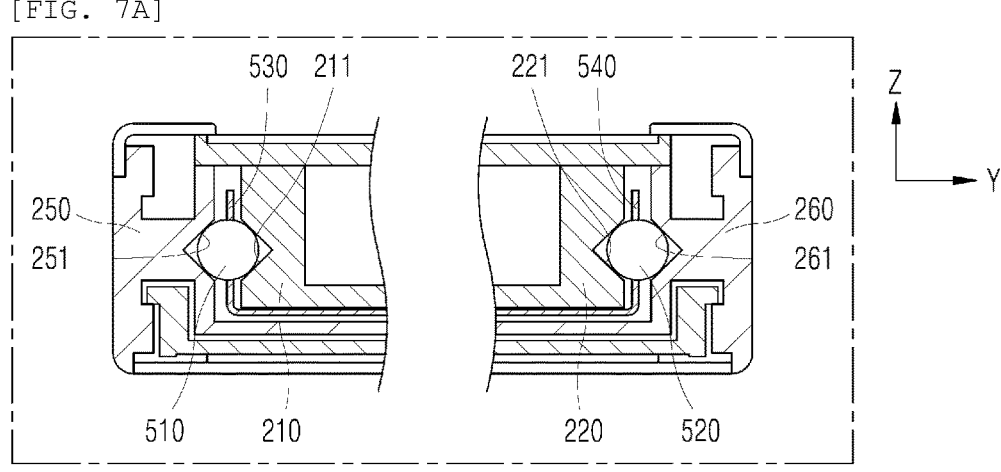
[FIG. 7B]
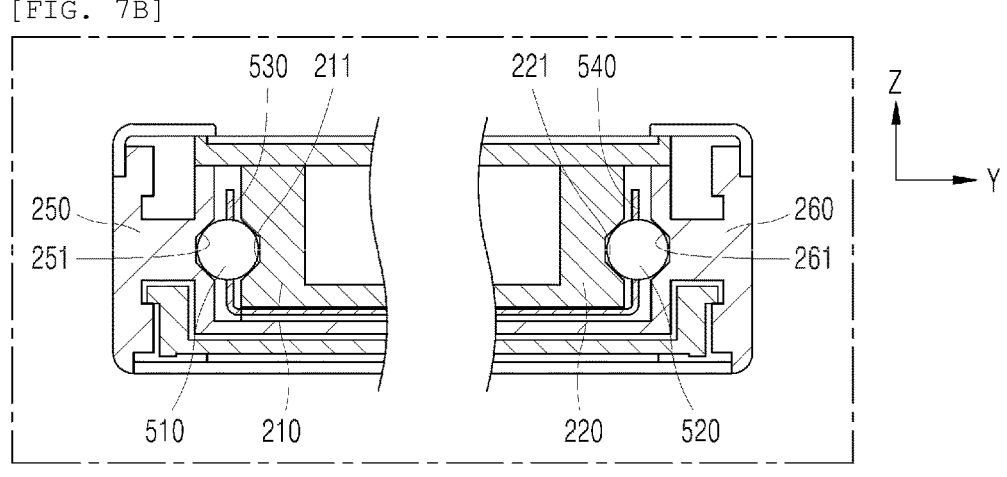

[FIG. 8A]
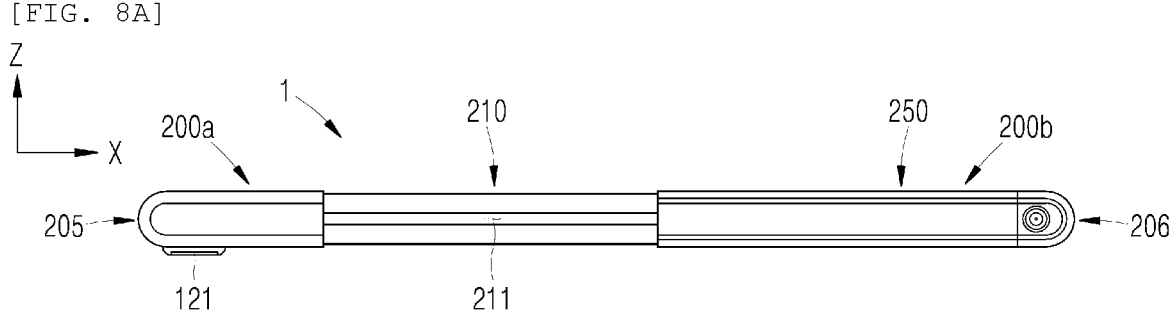
[FIG. 8B]
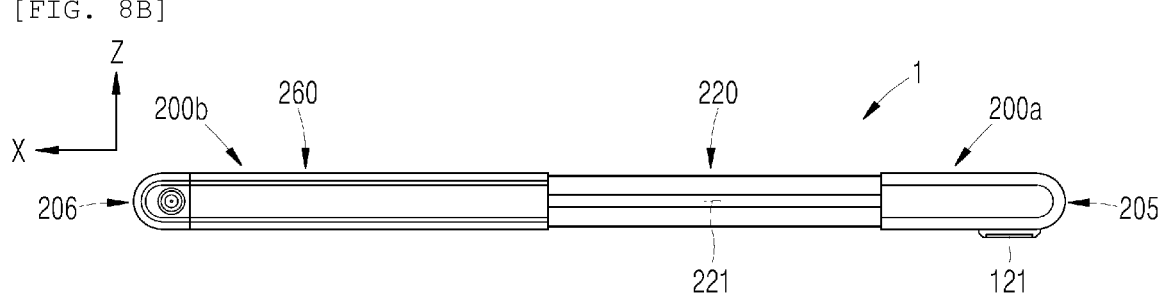
[FIG. 9]
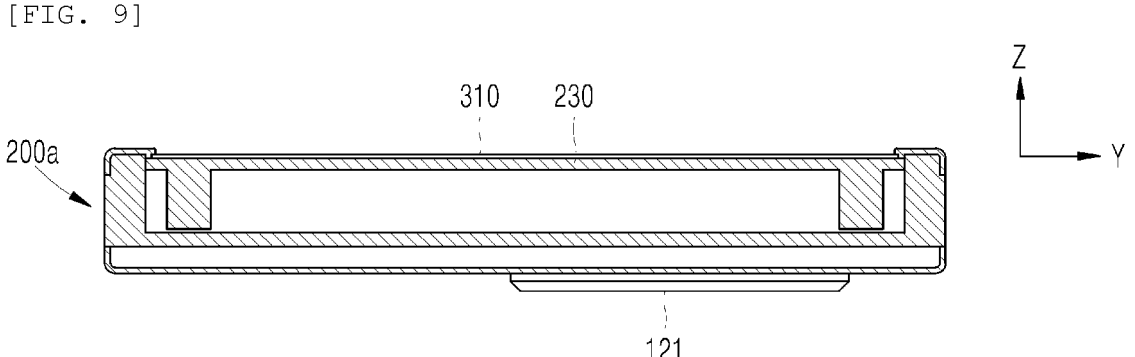

[FIG. 10A]
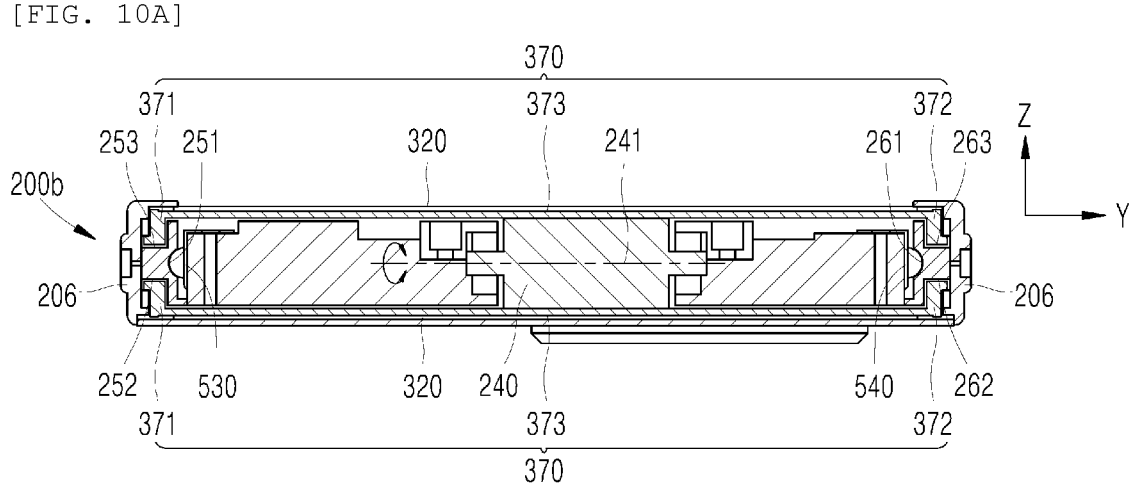
[FIG. 10B]
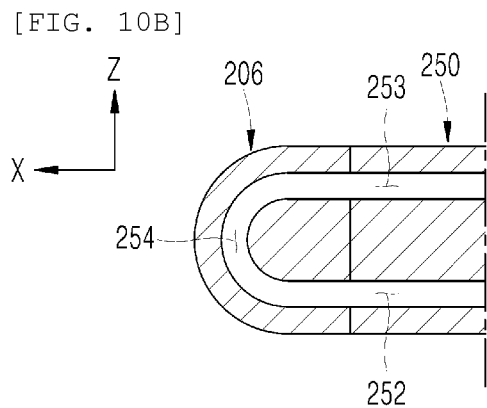
[FIG. 10C]
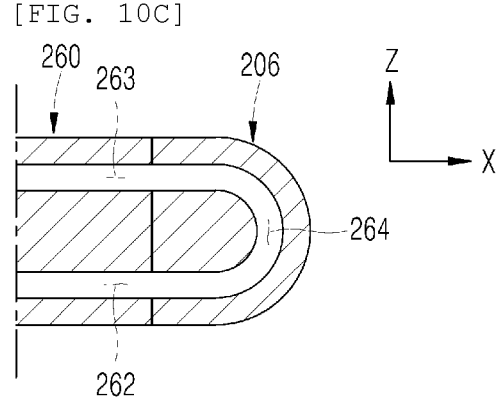

[FIG. 11A]
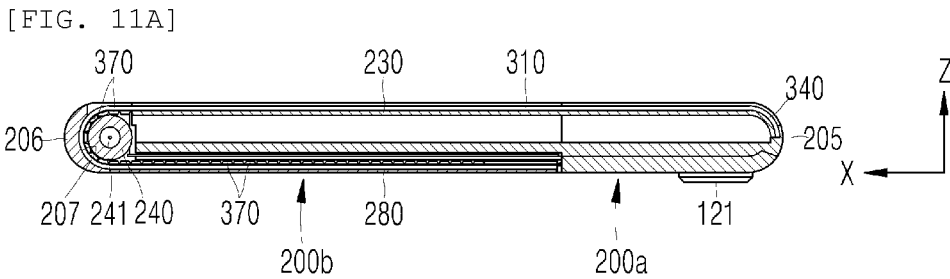
[FIG. 11B]
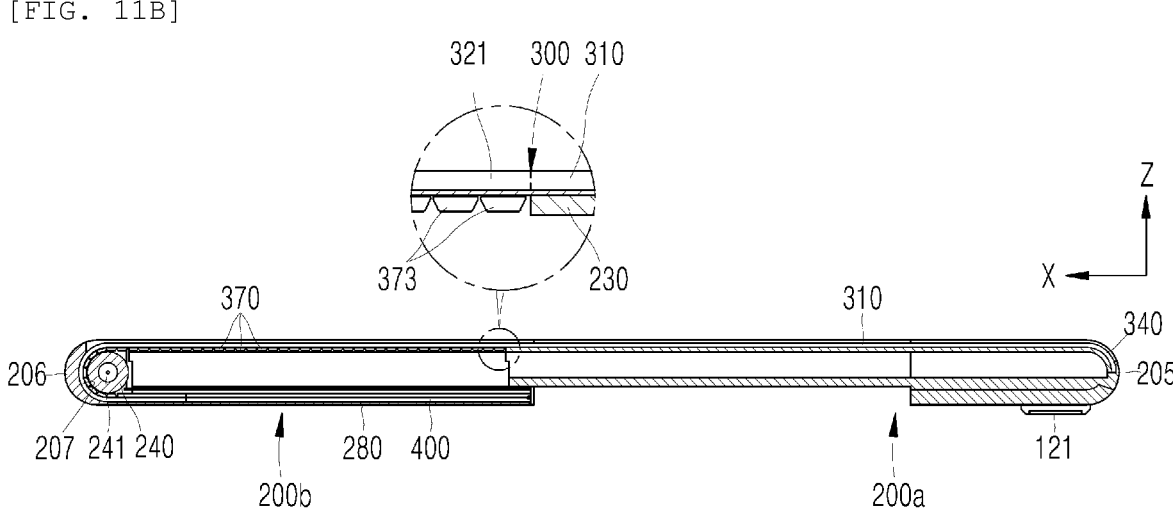
[FIG. 12A]
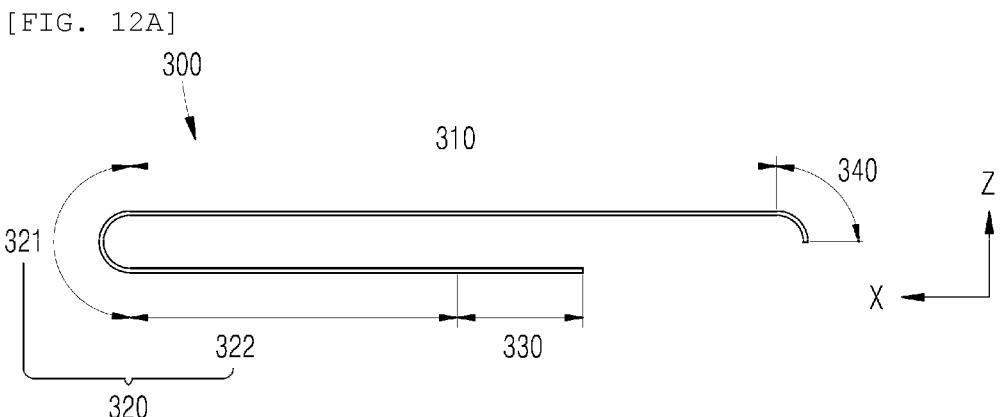

[FIG. 12B]
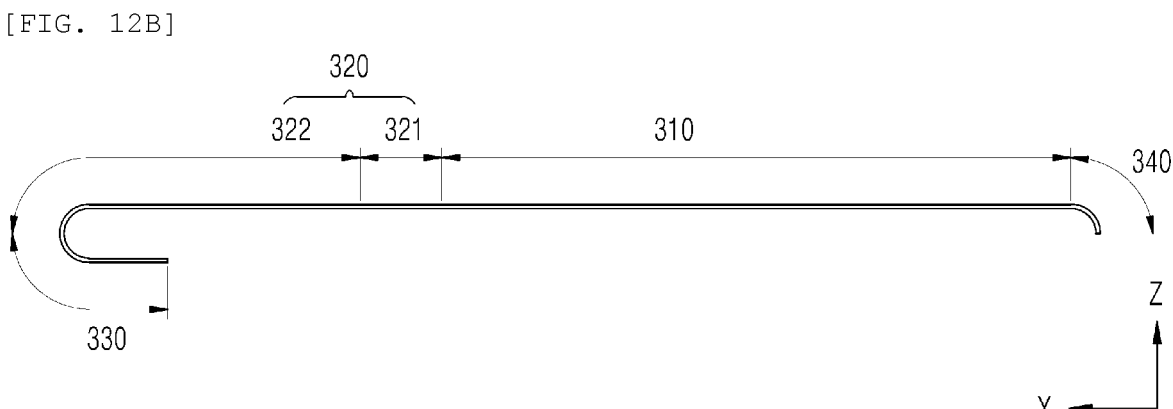
[FIG. 13A]
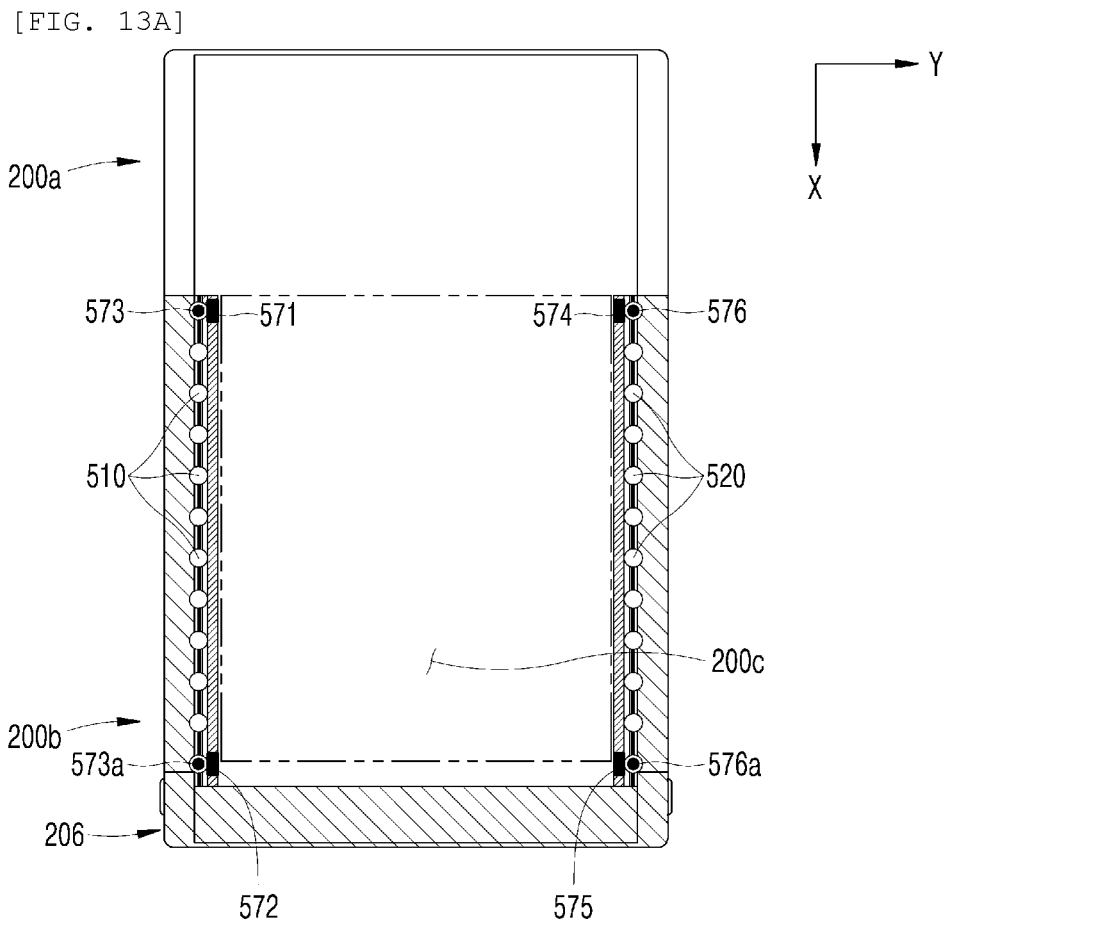

[FIG. 13B]
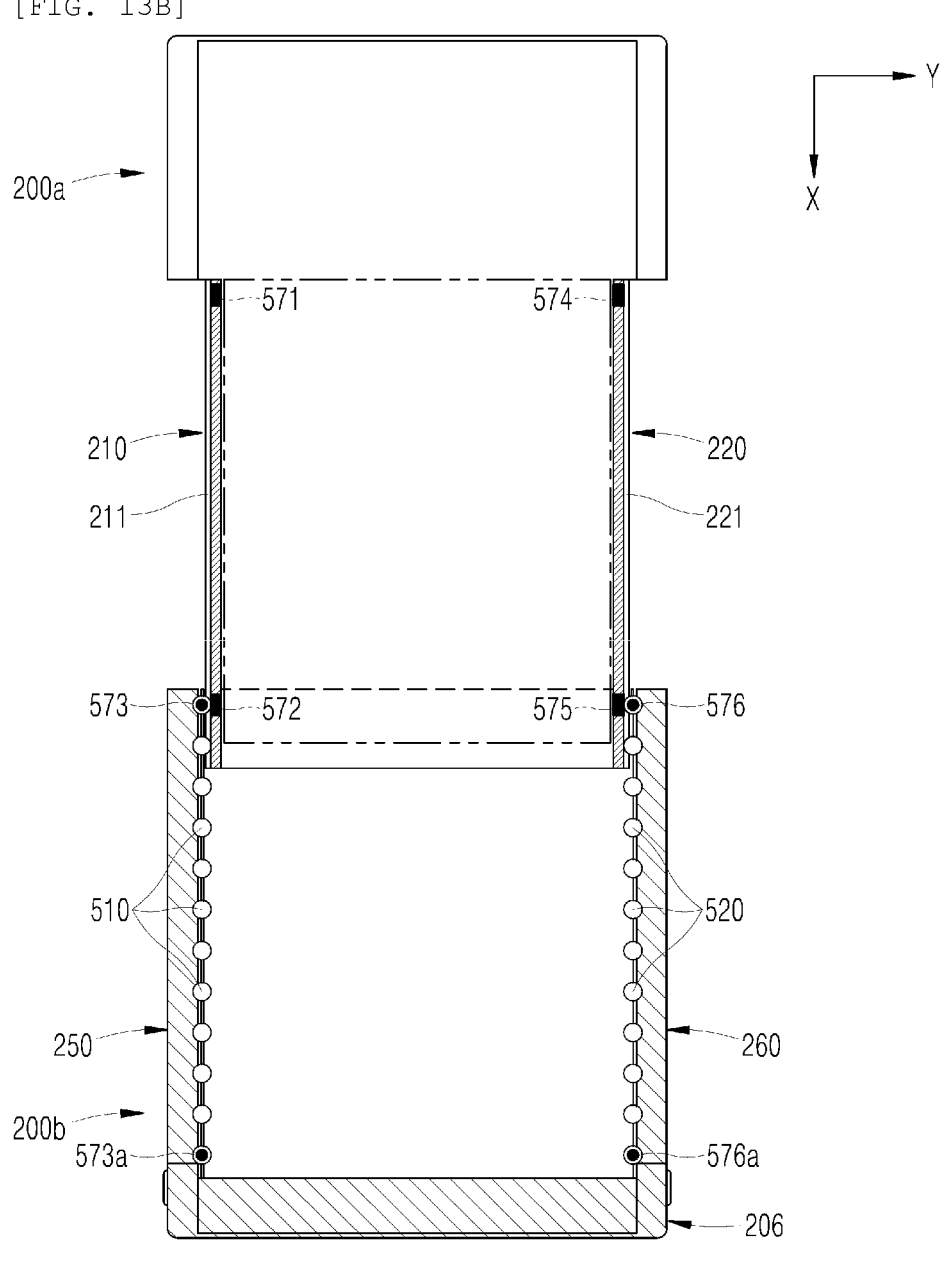

[FIG. 14A]
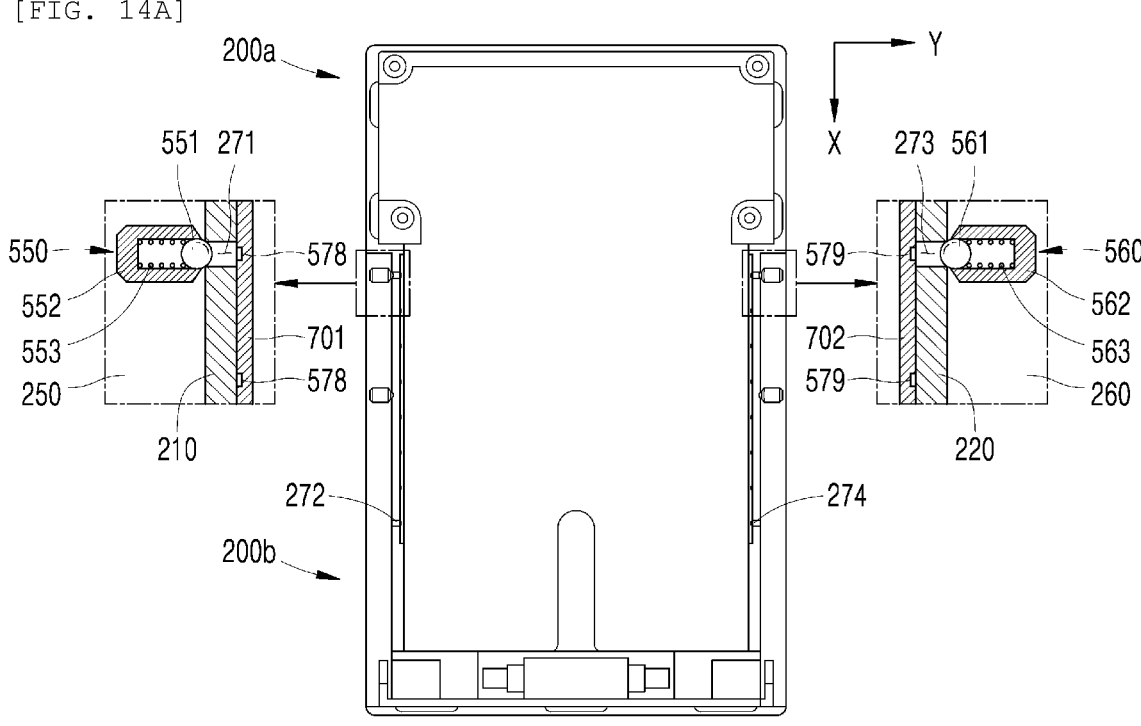

[FIG. 14B]
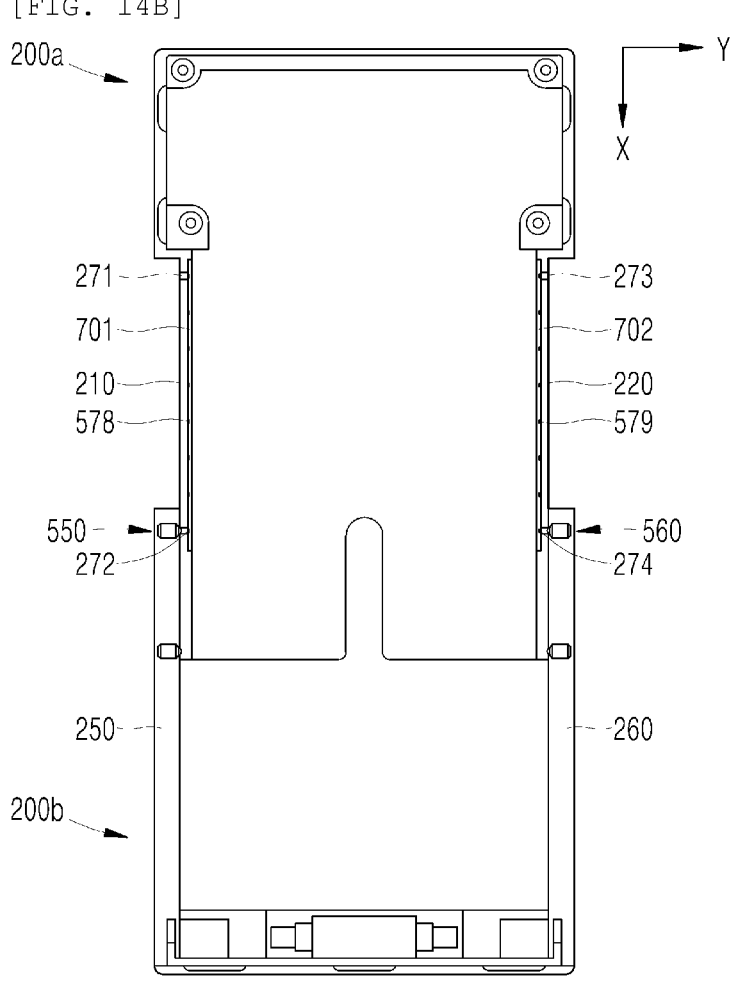

[FIG. 15A]
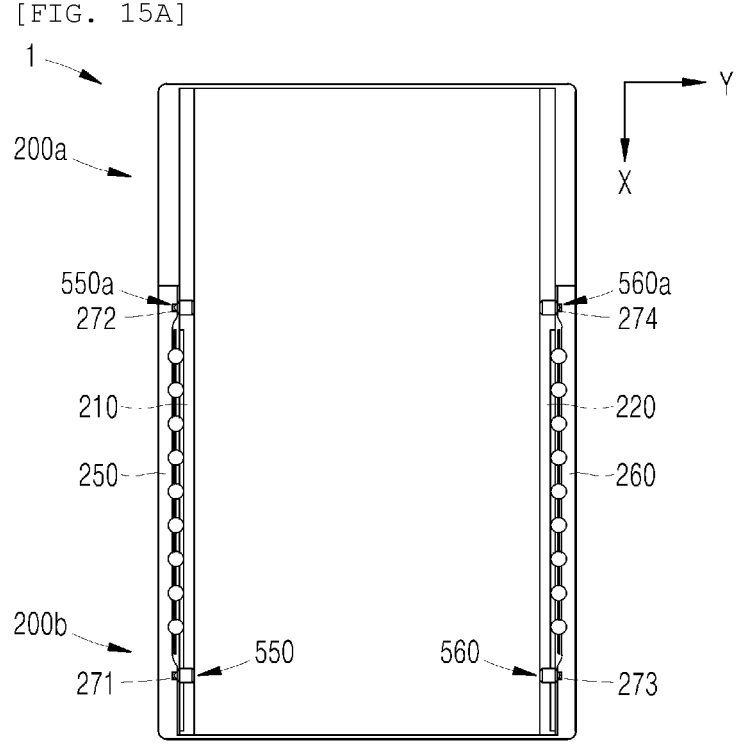

[FIG. 15B]
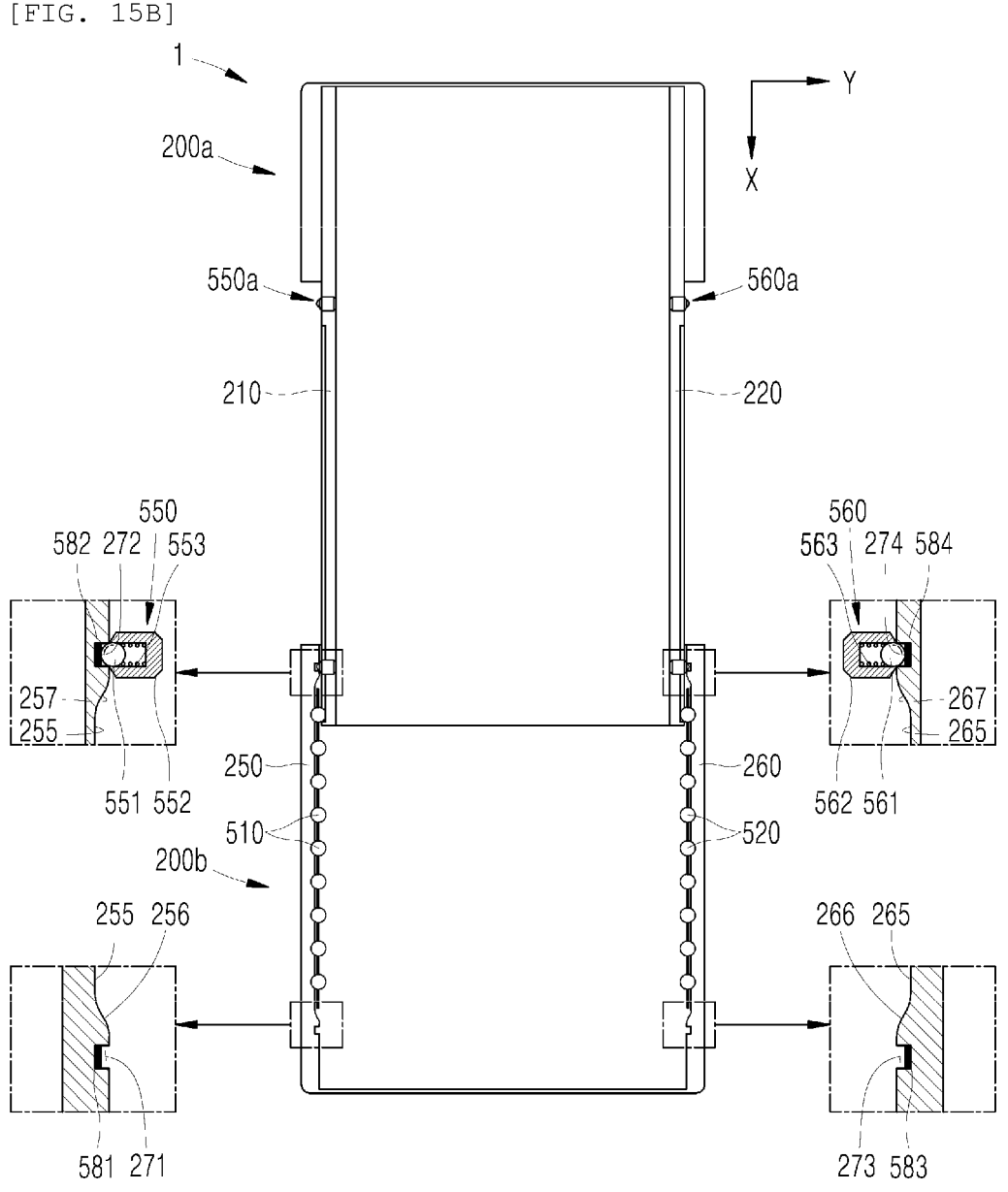

[FIG. 16]
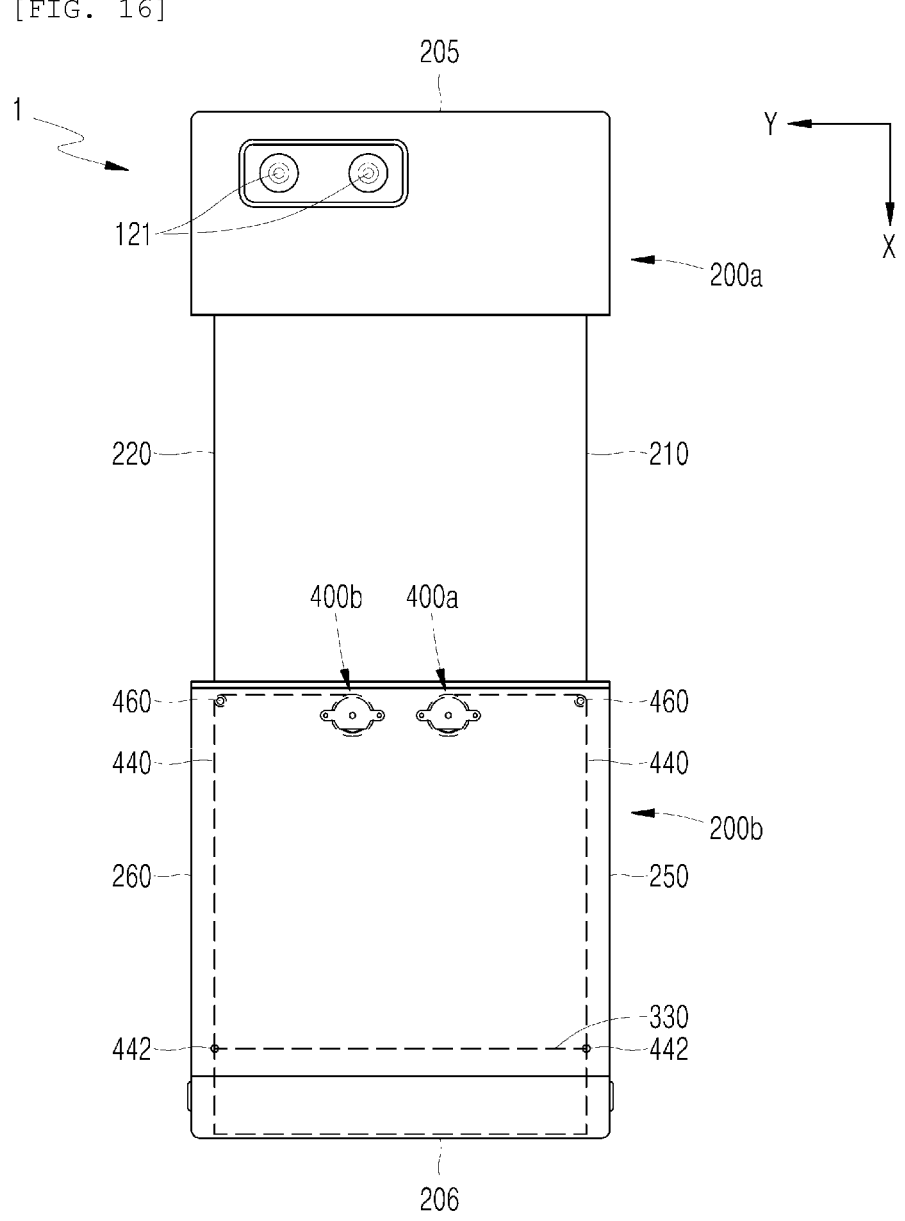

[FIG. 17]
<u>400, 400a, 400b</u>
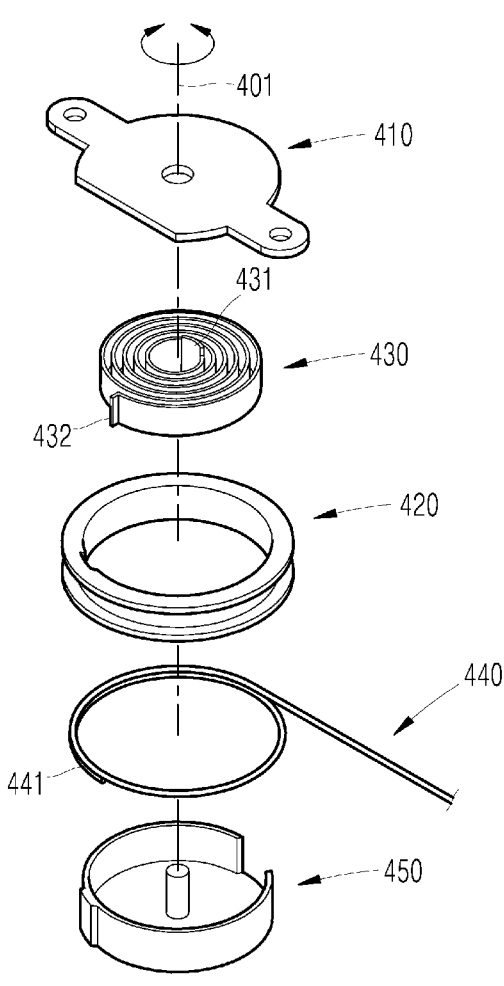

FLEXIBLE DISPLAY DEVICE

CROSS REFERENCE TO RELATED APPLICATIONS

This application is the National Phase of PCT International Application No. PCT/KR2020/004916, filed on Apr. 10, 2020, all of which is hereby expressly incorporated by reference into the present application.

TECHNICAL FIELD

The present disclosure relates to a portable device including a flexible display, in which the overall size of the device is variable while two bodies of the device slide relative to each other.

BACKGROUND ART

T With the development of a flexible display that is bendable while displaying image information, research and development has come to be conducted on a foldable-type device in which a flexible display is applied to a device having two bodies and a folding structure (e.g., a hinge). In this device, since the flexible display may be disposed over both of the two bodies across the folding structure, a large-screen display may be implemented in the device.

As another device using a flexible display, development and research has come to be conducted on a rollable type device having a structure in which a display is wound. In this device, when the flexible device is rolled, the size or area of the entire display may decrease, and when the flexible display is unrolled, the size or area of the entire display may increase.

Another device using a flexible display has been introduced in which, when two bodies slide relative to each other, the flexible display that forms a U-shape by being bent in the middle portion is deformable, so that the area of the display visible from one side is variable.

As a document of prior art using a flexible display related thereto, Korean Patent Registration No. 1107127 (hereinafter, "prior art document") discloses a mobile terminal which includes a terminal body, a sliding member, a flexible display, and a rotating shaft.

The mobile terminal according to the prior art document is configured such that a sliding member is in surface contact with the terminal body in a state in which the sliding member is not drawn out from the terminal body. While the sliding member is drawn out from the terminal body, both the terminal body and the sliding member move relative to each other while maintaining surface contact, and when the drawing-out is completed, a display having a relatively large screen is provided.

In a device in which a flexible display is transformed while two bodies (in the case of the prior art document, the terminal body and the sliding member) move relative to each other, it is necessary for the two bodies to stably operate while minimizing the frictional force generated therebetween for easy operation.

Smartphones, which occupy a significant market proportion among mobile phones, are configured to have various functions. For this purpose, the smartphones include a battery, various sensors including a touch sensor, cameras, and the like. Recently, various smartphones including a flexible display have also been introduced.

Accordingly, in the device in which the flexible display is transformed while two bodies move relative to each other, it is required to develop a device capable of securing a space in which various components are accommodated while having a configuration necessary for the relative movement of the two bodies.

A flexible display device may be stored for a relatively long period of time in a state in which the middle portion of a flexible display forms a U-shape. In this case, when the flexible display device is transformed, the middle portion of the flexible display forming the U-shape may not be completely flattened, and the flat portion of the flexible display may not form a complete U-shape. These phenomena may occur due to plastic deformation and springback, which occur in a portion of the flexible display, and/or elasticity of the flexible display.

Therefore, even in consideration of these properties according to the transformation of the flexible display, there is a need to develop a flexible display device that ensures stable and accurate operation.

DISCLOSURE OF INVENTION

Technical Problem

One problem to be solved by the present disclosure is to provide a flexible display device in which, when a flexible display is transformed while two bodies move relative to each other, point contact is made at the portion where a relative movement occurs so that a frictional force generated during the movement can be reduced and a movement in an unintended direction can be prevented.

Another problem to be solved by the present disclosure is to provide a flexible display device in which a flexible display is transformed while the two bodies move relative to each other, in which, while a structure configured to guide the relative movement of two bodies is provided in a rim side of the device, the exposure of the structure to the outside of the device can be minimized.

Still another problem to be solved by the present disclosure is to provide a flexible display device in which a flexible display is transformed while two bodies move relative to each other, in which each body can be accurately placed at an intended position.

Solution to Problem

A flexible display device according to an exemplary embodiment of the present disclosure is configured to be carried and held by a user.

The flexible display device includes a first body, a second body, and a flexible display.

The second body is configured to reciprocate between a first position and a second position in a first direction relative to the first body. The first position is a relative position of the second body relative to the first body, and the second position is also a relative position of the second body with respect to the first body.

When the second body is located at the first position relative to the first body, the state of the flexible display device corresponds to a first state, and when the second body is located at the second position relative to the first body, the state of the flexible display device correspond to a second state. Accordingly, in the description of the present disclosure, the term "first position" may be used in the same meaning as the "first state of the flexible display device", and the term "second position" may have the same meaning as the "second state of the flexible display device".

The second body may be provided with a support.

The support may form a curved surface around a center line of curvature parallel to a second direction orthogonal to the first direction.

The flexible display may include a first region and a second region.

A portion of the second region is bent in a semicircular shape, and the bent position of the second region is changed according to the movement of the second body.

The second region may include a first connection region and a second connection region.

The first region may be fixed in front of the first body and directed forward. The first region may configure the front surface of the flexible display device. The first region may be provided as a flat surface.

The first connection region extends from the first region.

The second connection region extends from the first connection region.

At the first position, the first connection region may be bent to form a curved surface, and the second connection region may be provided to be parallel to the first region.

At the first position, the first connection region may be placed on the support to form a curved surface.

At the second position, the first connection region is coplanar with the first region, and a portion of the second connection region is bent to form a curved surface.

At the second position, a portion of the second connection region may be placed on the support to form a curved surface.

The flexible display device includes a plurality of rolling balls and at least one rolling recess.

When the rolling balls are coupled to the first body, the rolling recess is provided in the second body, and when the rolling balls are coupled to the second body, the rolling recess is provided in the first body.

That is, the rolling balls are coupled to one of the first body and the second body, and the rolling recess is provided in the other one of the first body and the second body.

The plurality of the rolling balls are spaced apart from each other and arranged in the first direction. Each of the rolling balls may be rotatably coupled to the first body or the second body.

The rolling recess is elongated in the first direction and is provided in the form of concave grooves with a constant cross section in the first direction. The rolling balls are in contact with the rolling recess, and in this state, the rolling balls and the rolling recess move relative to each other.

The rolling balls may move relative to the rolling recess while rolling in contact with the rolling recess.

The rolling balls and the rolling recess may be combined with each other, and may be respectively provided on opposite sides of the flexible display device.

The first body may include inner edges. The rolling recess may be provided in the inner edges.

The inner edges include a first inner edge and a second inner edge. The first inner edge and the second inner edge may configure opposite rims of the first body and may be elongated in the first direction.

Of the rolling recesses, a first rolling recess is provided in the first inner edge.

Of the rolling recesses, a second rolling recess opposite to the first rolling edge is provided in the second inner edge.

The second body may include outer edges. The outer edges may be located outside the inner edges, respectively, and the rolling balls may be coupled to the outer edges.

The outer edges include a first outer edge and a second outer edge. The first outer edge and the second outer edge may configure opposite rims of the second body and may be elongated in the first direction.

The first outer edge may be located outside the first inner edge, and among the rolling balls, first rolling balls moving along the first rolling recess may be coupled to the first outer edge.

The second outer edge may be located outside the second inner edge, and among the rolling balls, second rolling balls moving along the second rolling recess may be coupled to the second outer edge.

The flexible display device may include a first support frame and a second support frame.

The first support frame is located between and spaced apart from an outer surface of the first inner edge and an inner surface of the first outer edge, and is fixed to the second body. First holes, which have a diameter smaller than the diameter of the first rolling balls, and into which the first rolling balls are fitted to protrude therefrom, respectively, are repeatedly provided in the first support frame in the first direction.

The second support frame is located between and spaced apart from an outer surface of the second inner edge and an inner surface of the second outer edge, and is fixed to the second body. Second holes, which have a diameter smaller than the diameter of the second rolling balls, and into which the second rolling balls are fitted to protrude therefrom, respectively, are repeatedly provided in the second support frame in the first direction.

The first rolling recess may be configured to be in point contact with the first rolling balls. The first rolling recess may be configured in the form of a curved or angled groove.

The second rolling recess may be configured to be in point contact with the second rolling balls. The second rolling recess may be configured in the form of a curved or angled groove.

Concave first support grooves may be provided on an inner surface of the first outer edge.

The first support grooves may be configured to be in point contact with the first rolling balls, respectively. The first support grooves may be provided in the form of a curved or angled groove.

Concave second support grooves may be provided on an inner surface of the second outer edge. The second support grooves may be configured to be in point contact with the second rolling balls, respectively. The second support grooves may be provided in the form of a curved or angled groove.

The second body may include a first rear guide groove, a first front guide groove, a first connection guide groove, a second rear guide groove, a second front guide groove, and a second connection guide groove.

The first rear guide groove provides a space inside the first outer edge, wherein the first rear guide may have a constant cross section in the first direction and may open inward from the rear side of the first outer edge.

The first front guide groove provides a space inside the first outer edge, wherein the first front guide groove may have a constant cross section in the first direction and may open inward from the front side of the first outer edge. The first front guide groove may be symmetric to the first rear guide groove.

The first connection guide groove may be provided to interconnect the first rear guide groove and the first front guide groove while providing a semicircular space inside the second body.

The second rear guide groove provides a space inside the second outer edge, wherein the second rear guide groove may have a constant cross section in the first direction and may open inward from the rear side of the second outer edge.

The second front guide groove provides a space inside the second outer edge, wherein the second front guide may have a constant cross section in the first direction and may open inward from the front side of the second outer edge. The second front guide groove may be symmetric to the second rear guide groove.

The second connection guide groove may be provided to interconnect the second rear guide groove and the second front guide groove while providing a semicircular space inside the second body.

The flexible display device may include a plurality of support bars.

Each of the support bars is configured to support the first connection region or the second connection region from the inside, and the plurality of the support bars are sequentially arranged along the first connection region and the second connection region.

Each support bar may include a first support slider, a second support slider, and a connection arm.

The first support slider is inserted into and moved in the first rear guide groove, the first connection guide groove, and the first front guide groove.

The second support slider is inserted into and moved in the second rear guide groove, the second connection guide groove, and the second front guide groove.

The connection arm interconnects the first support slider and the second support slider, supports the inner surface of the flexible display, and helps the first connection region and the second connection region to maintain a stable flat or curved state.

The first body may include a support plate. The support plate is configured to support the first region from the inside. The support plate may be flat, and may have the same size as the first region.

The front surface of the connection arm and the front surface of the support plate may be coplanar with each other.

One of the first body and the second body may be provided with a first magnet and a second magnet, and the other may be provided with a first stopper.

The first magnet and the second magnet are spaced apart from each other in the first direction.

The first stopper is configured to be in contact with or approach the first magnet at the first position so that an attractive force acts between the first stopper and the first magnet, and to be in contact with or approaches at the second position so that an attractive force acts between the first stopper and the second magnet.

The first magnet and the second magnet may be coupled to the inner edges, may be located to be spaced apart from each other and to be respectively adjacent to opposite ends of the rolling recess.

The first stopper may be coupled to the outer edge.

The rolling recess, the first magnet, and the second magnet may be formed on the same line along the first direction.

The first stopper may have a spherical shape and may be configured to be inserted into the rolling recess to move along the rolling recess.

The first magnet and the second magnet, which are spaced apart from each other, may be coupled to one of the first inner edge and the first outer edge, and the other of the first inner edge and the first outer edge may be provided with a first stopper configured such that, depending on the movement of the second body, an attractive force acts between the first magnet and the first stopper or between the second magnet and the first stopper.

The third magnet and the fourth magnet, which are spaced apart from each other, may be coupled to one of the second inner edge and the second outer edge, and the other of the second inner edge and the second outer edge may be provided with a second stopper configured such that, depending on the movement of the second body, an attractive force acts between the third magnet and the second stopper or between the fourth magnet and the stopper.

Each of the first magnet, the second magnet, and the first stopper may be symmetric with each of the third magnet, the fourth magnet, and the second stopper.

A stopping ball may be coupled to one of the first body and the second body, and a plurality of Hall sensors configured to detect the stopping ball may be arranged on the other of the first body and the second body in the first direction.

The flexible display device may include a controller configured to control the flexible display according to position information of the stopping ball detected by the Hall sensors.

One of the first body and the second body is provided with a first stopping groove and a second stopping groove, and a ball plunger may be coupled to the other of the first body and the second body.

The first stopping groove and the second stopping groove have a concave groove shape.

The ball plunger includes a stopping ball. The stopping ball of the ball plunger is inserted into the first stopping groove at the first position and inserted into the second stopping groove at the second position.

The first stopping groove and the second stopping groove may be provided on the inner edge, and may be spaced apart from each other and respectively provided adjacent to opposite ends of the rolling recess.

The ball plunger may be coupled to the outer edge.

The ball plunger may include a stopping ball, a cylinder in which the stopping ball is accommodated to protrude, and a spring accommodated in the cylinder to elastically support the stopping ball.

One of the first inner edge and the first outer edge may be provided with a first stopping groove and a second stopping groove in the form of a concave groove to be spaced apart from each other, and a first ball plunger including a first stopping ball configured to be inserted into the first stopping groove or the second stopping groove depending on the movement of the second body may be coupled to the other of the first inner edge and the first outer edge.

One of the second inner edge and the second outer edge may be provided with a third stopping groove and a fourth stopping groove in the form of a concave groove to be spaced apart from each other, and a second ball plunger including a second stopping ball configured to be inserted into the third stopping groove or the fourth stopping groove depending on the movement of the second body may be coupled to the other of the second inner edge and the second outer edge.

Each of the first stopping groove, the second stopping groove, and the first ball plunger may symmetric with each of the third stopping groove, the fourth stopping groove, and the second ball plunger.

The ball plungers may be coupled to the inner edges.

The first stopping groove and the second stopping groove may be provided in the outer edge. When the rolling balls are provided in the outer edge, the first stopping groove and the second stopping groove may be respectively located on opposite sides with reference to a series of the rolling balls.

The second body may include a first moving surface, a first inclined surface, and a second inclined surface.

The first moving surface is configured to provide a path on which the stopping ball moves between the first stopping groove and the second stopping groove.

The first inclined surface interconnects the first stoppling groove and the first moving surface and is configured to provide an inclined surface that approaches the outer edge as it goes toward the first stopping groove.

The second inclined surface interconnects the second stoppling groove and the first moving surface and is configured to provide an inclined surface that approaches the outer edge as it goes toward the second stopping groove.

Advantageous Effects of Invention

In the flexible display device according to an exemplary embodiment of the present disclosure, a plurality of spherical rolling balls, which are arranged in a first direction, are coupled to one of the first body and the second body, and the other of the first body and the second body is provided with a rolling recess in the form of a concave groove having a constant cross section in the first direction so that the rolling balls move in point contact with the rolling recess. When the flexible display is transformed while the second body moves relative to the first body, the rolling balls move along the rolling recess while being in point contact with the rolling recess. This makes it possible to reduce a frictional force when the flexible display device is transformed, and to prevent the flexible display from moving in an unintended direction in the flexible display device.

In the flexible display device according to an exemplary embodiment of the present disclosure, the first body may include a first inner edge which is provided with a first rolling recess and a second inner edge which is provided with a second rolling recess, and the second body may include a first outer edge to which the first rolling balls are coupled, and a second outer edge to which the second rolling balls are coupled. The first rolling balls, the second rolling balls, the first rolling recess, and the second rolling recess, which guide the relative movement between the first body and the second body may be provided on opposite side rims of the flexible display device, and when the second body is transformed from the first position to the second position relative to the first body, only the first rolling recess and the second rolling recess are exposed to the outside.

The flexible display device according to an exemplary embodiment of the present disclosure includes a magnet and a Hall sensor. In addition, the flexible display device may include a controller configured to control the flexible display according to position information of the magnet detected by the Hall sensor. This makes it possible to identify whether the second body is disposed at the first position, at the second position, or between the first position and the second position relative to the first body. According to each position of the second body, it is possible to perform control of an image such that an image is displayed on the flexible display, an image is not displayed, or an image to be displayed is changed.

The flexible display device according to an exemplary embodiment of the present disclosure may include a first stopping groove, a second stopping groove, and a first ball plunger. In addition, the flexible display device may include a third stopping groove, a fourth stopping groove, and a second ball plunger. At the first position, the first stopping ball is inserted into the first stopping groove and the second stopping ball is inserted into the third stopping groove. At the second position, the first stopping ball is inserted into the second stopping groove and the second stopping ball is inserted into the fourth stopping groove. This makes it possible to cause the second body to be placed at an intended correct position relative to the first body and to stably operate.

A flexible display device according to an exemplary embodiment of the present disclosure includes a first magnet, a second magnet, and a first stopper. In addition, the flexible display device includes a third magnet, a fourth magnet, and a second stopper. This makes it possible to cause the second body to be placed at an intended correct position relative to the first body and to stably operate.

BRIEF DESCRIPTION OF DRAWINGS

FIG. 1 is a block diagram for describing a flexible display device.

FIG. 2A is a perspective view illustrating a first state of the flexible display device, and FIG. 2B is a perspective view illustrating a second state in which the flexible display device illustrated in FIG. 2A is transformed.

FIG. 3A is a rear view illustrating the flexible display device of FIG. 2A, and FIG. 3B is a rear view illustrating the flexible display device illustrated in FIG. 2B.

FIG. 4A is a perspective view illustrating the flexible display separated from the flexible display device in the first state, and FIG. 4B is a perspective view illustrating a transformed state (the second state) of the flexible display of FIG. 4A.

FIGS. 5A and 5B are views for describing a coupling relationship between rolling balls and rolling recesses, in which the state of the inside of the flexible display device is schematically illustrated. FIG. 5A illustrates a first state, and FIG. 5B illustrates a second state.

FIG. 6 is a cross-sectional view taken along line A-A' in FIG. 2A, and FIGS. 7A and 7B are cross-sectional views each illustrating a portion of the flexible display device according to another exemplary embodiments.

FIGS. 8A and 8B are side views each illustrating the flexible display device of FIG. 2B.

FIG. 9 is a cross-sectional view taken along line B-B' of FIG. 2A.

FIG. 10A is a cross-sectional view taken along line C-C' in FIG. 2A. FIG. 10B is a cross-sectional view illustrating the inner surface side of a first outer edge and a second edge, and FIG. 10C is a cross-sectional view illustrating the inner surface side of a second outer edge and a second edge.

FIG. 11A is a cross-sectional view taken along line D-D' in FIG. 2A. FIG. 11B is a cross-sectional view illustrating a transformed state of the flexible display device of FIG. 11A.

FIG. 12A is a cross-sectional view illustrating the flexible display of FIG. 11A in the separated state, and FIG. 12B is a cross-sectional view illustrating the flexible display of FIG. 11B in the separated state.

FIGS. 13A and 13B are views for describing the relationship between first and second magnets and a first stopper, and the relationship between third and fourth magnets and a second stopper, in which the states of the inside of a portion of the flexible display device are illustrated.

FIGS. 14A and 14B are views for describing the relationship of ball plungers, stopping grooves, and Hall sensors; in which the states of the inside of the flexible display device are schematically illustrated.

FIGS. 15A and 15B are views for describing the relationship between the stopping grooves and the ball plungers, in which the states of the inside of the flexible display device are schematically illustrated.

FIG. 16 is a rear view schematically illustrating a flexible display device.

FIG. 17 is a view illustrating a tension generator.

BEST MODE FOR CARRYING OUT THE INVENTION

Hereinafter, exemplary embodiments disclosed herein will be described in detail with reference to the accompanying drawings, and like reference numerals designate like elements, and redundant description thereof will be omitted. Suffixes "module" and "unit or portion" for elements used in the following description are merely provided for facilitation of preparing this specification, and thus they are not granted a specific meaning or function. Wherever possible, the same reference numbers will be used throughout the drawings to refer to the same or like parts. In the following description, known functions or structures, which may confuse the substance of the present disclosure, are not explained. The accompanying drawings are used to help easily explain various technical features and it should be understood that the embodiments presented herein are not limited by the accompanying drawings. As such, the present disclosure should be construed to extend to any alterations, equivalents and substitutes in addition to those which are particularly set out in the accompanying drawings.

Although the terms first, second, and the like, may be used herein to describe various elements, these elements should not be limited by these terms. These terms are generally only used to distinguish one element from another.

When an element or layer is referred to as being "on," "engaged to," "connected to," or "coupled to" another element or layer, it may be directly on, engaged, connected, or coupled to the other element or layer, or intervening elements or layers may be present. In contrast, when an element is referred to as being "directly on," "directly engaged to," "directly connected to," or "directly coupled to" another element or layer, there may be no intervening elements or layers present.

The singular expressions include plural expressions unless the context clearly dictates otherwise.

It should be understood that the terms "comprises," "comprising," "includes," "including," "containing," "has," "having" or any other variation thereof specify the presence of stated features, integers, steps, operations, elements, and/or components, but do not preclude the presence or addition of one or more other features, integers, steps, operations, elements, and/or components.

A flexible display device (also referred to as a 'display device') described in the present specification may include a mobile terminal such as a portable phone, a smartphone, a laptop computer, a digital broadcasting terminal, a personal digital assistant (PDA), a portable multimedia player (PMP), a navigation, a slate PC, a tablet PC, an ultra-book, a wearable device, a smart watch, a smart glass, a head mounted display (HMD), and the like.

It will be apparent to those skilled in the art that the configuration according to the embodiment disclosed in present specification may be applied to a fixed terminal such as a digital TV, a desktop computer, a digital signage except for an example that is applied only to a mobile terminal. Hereinafter, in the present disclosure, for the convenience of description, the mobile terminal will be first described as an example of the display device.

FIG. 1 is a block diagram for explaining a mobile terminal 100 according to the present disclosure.

The mobile terminal 100 may include, for example, a wireless transceiver 110, an input interface 120, a sensor 140, an output interface 150, an interface 160, a memory 170, a controller 180, and a power supply 190. The components shown in FIG. 1 are not essential to implement the mobile terminal, and the mobile terminal described in the present disclosure may include more or fewer components than the components described above.

More specifically, the wireless transceiver 110 may include one or more modules that enable wireless communication between the mobile terminal 100 and a wireless communication system, between the mobile terminal 100 and another mobile terminal 100, or between the mobile terminal 100 and an external server. Further, the wireless transceiver 110 may include one or more modules that connect the mobile terminal 100 to one or more networks.

The wireless transceiver 110 may include at least one of a broadcast receiving module 111, a mobile communication module 112, a wireless internet module 113, a near field communication module 114, or a position information module 115.

The input interface 120 may include a camera 121 or an image input interface that inputs an image signal, a microphone 122 or an audio input interface that inputs an audio signal, and a user input interface 123 (for example, a touch key or a mechanical key) that receives information from a user. Voice data or image data collected by the input interface 120 may be analyzed and processed as a control command of the user.

The sensor 140 may include one or more sensors that sense at least one of information in the mobile terminal, surrounding environment information around the mobile terminal, or user information. For example, the sensor 140 may include at least one of a proximity sensor 141, an illumination sensor 142, a touch sensor, an acceleration sensor, a magnetic sensor, a G-sensor, a gyroscope sensor, a motion sensor, an RGB sensor, an infrared (IR) sensor, a finger scan sensor, an ultrasonic sensor, an optical sensor (for example, a camera 121), a microphone 122, a battery gauge, an environment sensor (for example, a barometer, a hygrometer, a thermometer, a radiation sensor, a thermal sensor, a gas sensor, etc.), or a chemical sensor (for example, an electronic nose, a healthcare sensor, and a biometric sensor). Further, the mobile terminal disclosed in the present specification may combine and utilize information sensed by at least two sensors from the above-mentioned sensors.

The output interface 150 generates outputs related to visual, auditory, or tactile senses, and may include at least one of a display 151, a sound output interface 152, a haptic module 153, or an optical output interface 154. The display 151 forms a mutual layered structure with a touch sensor, or is formed integrally to be implemented as a touch screen. The touch screen simultaneously may serve as a user input interface 123 that provides an input interface between the mobile terminal 100 and the user while providing an output interface between the mobile terminal 100 and the user.

The interface 160 serves as a passage between the mobile terminal 100 and various types of external devices that are connected to the mobile terminal 100. The interface 160 may include at least one of a wired/wireless headset port, an external charger port, a wired/wireless data port, a memory card port, a port for connecting a device equipped with an identification module, an audio input/output (I/O) port, a video input/output (I/O) port, or an earphone port. As the external device is connected to the interface 160, the mobile terminal 100 may perform appropriate control on the connected external device.

Further, the memory 170 may store data that supports various functions of the mobile terminal 100. The memory 170 may store a plurality of application programs (or applications) driven in the mobile terminal, and data and commands for operations of the mobile terminal 100. At least some of the application programs may be downloaded from an external server through wireless communication. Further, at least some of the application programs for the basic functions of the mobile terminal 100 (for example, functions for receiving and making calls and receiving and sending messages) may be provided in the mobile terminal 100 from the time of manufacture. The application programs may be stored in the memory 170, and may be installed on the mobile terminal 100 so as to be driven by the controller 180 to perform operations (or functions) of the mobile terminal.

In addition to the operations related to the application programs, the controller 180 may generally control overall operation of the mobile terminal 100. The controller 180 may process a signal, data, or information that is inputted or outputted through the above-described components or drive the application programs stored in the memory 170 to provide or process appropriate information or functions to the user.

Further, in order to drive the application programs stored in the memory 170, the controller 180 may control at least some of components described with reference to FIG. 1. Moreover, the controller 180 may combine and operate at least two of components included in the mobile terminal 100 to drive the application programs.

Under the control of the controller 180, the power supply 190 may be supplied with external power or internal power, and supply power to each component included in the mobile terminal 100. The power supply 190 includes a battery, which may be a built-in battery or a replaceable battery.

At least some of the above-described components may operate in cooperation with each other to implement the operation, the control, or the control method of the mobile terminal according to various embodiments which will be described below. Further, the operation, the control, or the control method of the mobile terminal may be implemented on the mobile terminal by driving at least one application program stored in the memory 170.

Hereinafter, prior to describing various embodiments implemented by the mobile terminal 100 described above, the above-mentioned components will be described in more detail with reference to FIG. 1.

The broadcast receiving module 111 of the wireless transceiver 110 receives a broadcast signal and/or broadcast-related information from an external broadcast management server through a broadcast channel. The broadcast channel may include a satellite channel and a ground wave channel. Two or more broadcast receiving modules for simultaneous broadcast reception or broadcast channel switching for at least two broadcast channels may be provided to the mobile terminal 100.

The broadcast management sever may refer to a server that generates and transmits a broadcast signal and/or broadcast-related information or a server that is supplied with the previously generated broadcast signal and/or broadcast-related information to transmit the broadcast signal and/or the broadcast-related information to the terminal. The broadcast signal may include not only a TV broadcast signal, a radio broadcast signal, and a data broadcast signal, but also a broadcast signal obtained by combining the TV broadcast signal or the radio broadcast signal with the data broadcast signal.

The broadcast signal may be encoded according to at least one of technical standards (or broadcast schemes, for example, ISO, IEC, DVB, or ATSC) for transmitting and receiving a digital broadcast signal, and the broadcast receiving module 111 may receive the digital broadcast signal using an appropriate method for the technical specification defined by the technical standards.

The broadcast-related information may refer to information related to a broadcast channel, a broadcast program, or a broadcast service provider. The broadcast-related information may also be provided over the mobile communication network. In this case, the broadcast-related information may be received by the mobile communication module 112.

The broadcast-related information may exist in various types, such as an electronic program guide (EPG) of a digital multimedia broadcast (DMB) or an electronic service guide (ESG) of a digital video broadcast-handheld (DVB-H). The broadcast signal and/or the broadcast-related information received by the broadcast receiving module 111 may be stored in the memory 170.

The mobile communication module 112 may transmit/receive a wireless signal to/from at least one of a base station, an external terminal, or a server over a mobile communication network established according to the technical standards or communication methods for mobile communication (for example, Global System for Mobile communication (GSM), Code Division Multi Access (CDMA), Code Division Multi Access 2000 (CDMA2000), Enhanced Voice-Data Optimized or Enhanced Voice-Data Only (EV-DO), Wideband CDMA (WCDMA), High Speed Downlink Packet Access (HSDPA), High Speed Uplink Packet Access (HSUPA), Long Term Evolution (LTE), and Long Term Evolution-Advanced (LTE-A)).

The wireless signal may include a voice call signal, a video call signal, or various types of data in accordance with transmission or reception of a text/multimedia message.

The wireless internet module 113 refers to a module for wireless internet connection, and may be embodied in the mobile terminal 100 or installed at the outside of the mobile terminal 100. The wireless internet module 113 may be configured to transmit/receive a wireless signal over a communication network according to wireless internet technologies.

The wireless internet technologies include, for example, wireless LAN (WLAN), wireless fidelity (Wi-Fi), Wi-Fi direct, digital living network alliance (DLNA), wireless broadband (WiBro), world interoperability for microwave access (WiMAX), high speed downlink packet access (HSDPA), high speed uplink packet access (HSUPA), long term evolution (LTE), and long term evolution-advanced (LTE-A). The wireless internet module 113 may transmit or receive data in accordance with at least one wireless internet technology within a range including internet technology that have not been described above.

From the viewpoint that the wireless internet connection through, for example, WiBro, HSDPA, HSUPA, GSM, CDMA, WCDMA, LTE, and LTE-A is performed over the mobile communication network, the wireless internet module 113 that performs the wireless internet connection over the mobile communication network may be understood as a type of the mobile communication module 112.

The near field communication module 114 is for short range communication, and may support the short range communication using at least one of Bluetooth™, radio frequency identification (RFID), infrared data association (IrDA), ultra-wideband (UWB), ZigBee, Near Field Communication (NFC), wireless fidelity (Wi-Fi), Wi-Fi Direct, or Wireless Universal Serial Bus (Wireless USB). The near field communication module 114 may support wireless communication between the mobile terminal 100 and the wireless communication system, between the mobile terminal 100 and the other mobile terminal 100, or between the mobile terminal 100 and a network in which the other mobile terminal 100 (or external server) is located, over the wireless local area network. The wireless local area network may be a wireless personal area network.

Here, the other mobile terminal 100 may be a wearable device (for example, a smart watch, a smart glass, or a head mounted display (HMD)) that is capable of exchanging data (or interworking) with the mobile terminal 100 according to the present disclosure. The near field communication module 114 may detect (or recognize) the wearable device that is capable of communicating with the mobile terminal 100, in the vicinity of the mobile terminal 100. Moreover, when the detected wearable device is authenticated to communicate with the mobile terminal 100 according to the present disclosure, the controller 180 may transmit at least a portion of data processed in the mobile terminal 100 to the wearable device through the near field communication module 114. Therefore, the user of the wearable device may use the data processed in the mobile terminal 100, through the wearable device. For example, according to this, when a phone call is received by the mobile terminal 100, the user may make a phone call through the wearable device, or when a message is received by the mobile terminal 100, the user may check the received message through the wearable device.

The position information module 115 is a module for obtaining a position (or a current position) of a mobile terminal, and its representative examples include a global positioning system (GPS) module or a wireless fidelity (Wi-Fi) module. For example, when the GPS module is utilized, the mobile terminal may obtain the position of the mobile terminal using a signal transmitted from the GPS satellite. As another example, when the Wi-Fi module is utilized, the mobile terminal may obtain the position of the mobile terminal based on information on a wireless access point (AP) that transmits and receives wireless signals with the Wi-Fi module. If necessary, the position information module 115 may alternatively or additionally perform a function of another module of the wireless transceiver 110 to obtain data on the position of the mobile terminal. The position information module 115 is a module used to obtain the position (or the current position) of the mobile terminal, and is not limited to a module that directly calculates or obtains the position of the mobile terminal.

Next, the input interface 120 is for inputting video information (or signal), audio information (or signal), data, or information inputted by the user, and the mobile terminal 100 may include one or a plurality of cameras 121 to input the video information. The camera 121 processes an image frame such as a still or moving image obtained by an image sensor in a video call mode or a photographing mode. The processed image frame may be displayed on the display 151 or stored in the memory 170. Further, the plurality of cameras 121 included in the mobile terminal 100 may be arranged to form a matrix structure, and a plurality of pieces of image information having various angles or focal points may be inputted to the mobile terminal 100 through the cameras 121 that form the matrix structure. Further, the plurality of cameras 121 may be arranged to form a stereo structure to obtain left and right images used to implement a stereoscopic image.

The microphone 122 processes an external sound signal as electrical speech data. The processed voice data may be utilized in various manners in accordance with the function (or an application program that is being executed) that is being performed by the mobile terminal 100. Various noise removal algorithms for removing noise generated during the process of receiving the external sound signal may be implemented in the microphone 122.

The user input interface 123 is for receiving information from the user, and when the information is inputted through the user input interface 123, the controller 180 may control the operation of the mobile terminal 100 so as to correspond to the inputted information. The user input interface 123 may include a mechanical input interface (or a mechanical key, for example, a button located on a front, rear, or side surface of the mobile terminal 100, a dome switch, a jog wheel, a jog switch, etc.) and a touch type input interface. For example, the touch type input interface may be formed as a virtual key, a soft key, or a visual key that is displayed on the touch screen through a software process, or a touch key that is disposed on a part other than the touch screen. The virtual key or visual key may be displayed on the touch screen in various shapes, and, for example, may be formed as graphics, text, icons, video, or a combination thereof.

The sensor 140 senses at least one of information in the mobile terminal, surrounding environment information around the mobile terminal, or user information, and generates a sensing signal corresponding to the information. The controller 180 may control the driving or the operation of the mobile terminal 100 or perform data processing, functions, or operations related to the application program installed in the mobile terminal 100, based on the sensing signal. Representative sensors among various sensors that may be included in the sensor 140 will be described in more detail below.

First, the proximity sensor 141 refers to a sensor that senses the presence of an object approaching a predetermined sensing surface or nearby objects, using an electromagnetic field force or infrared ray without any mechanical contact. The proximity sensor 141 may be disposed in an internal area of the mobile terminal that is enclosed by the above-described touch screen or in the vicinity of the touch screen.

Examples of the proximity sensor 141 may include, for example, a transmission type photoelectric sensor, a direct reflection type photoelectric sensor, a mirror reflection type photoelectric sensor, a high frequency oscillation type proximity sensor, a capacitive proximity sensor, a magnetic proximity sensor, and an infrared proximity sensor. When the touch screen is a capacitive type, the proximity sensor 141 may be configured to detect the proximity of an object with a change in the electric field in accordance with the proximity of the object having conductivity. In this case, the touch screen (or the touch sensor) itself may be classified as a proximity sensor.

For convenience of description, when the object approaches the touch screen without contacting the touch screen, and it is recognized that the object is located over the touch screen, it is referred to as a "proximity touch". When the object actually touches the touch screen, it is referred to as a "contact touch". A position at which the object proximately touches the touch screen refers to a position at which the object vertically corresponds to the touch screen when the object proximately touches the touch screen. The proximity sensor 141 may sense the proximity touch and a proximity touch pattern (for example, a proximate touch distance, a proximate touch direction, a proximate touch speed, a proximate touch time, a proximate touch position, and a proximate touch movement state). As described above, the controller 180 may process data (or information) corresponding to the proximate touch operation and the proximate touch pattern sensed by the proximity sensor 141, and may further display visual information corresponding to the processed data on the touch screen. Furthermore, the controller 180 may control the mobile terminal 100 to process different operations or data (or information) depending on whether the touch on the same point on the touch screen is the proximity touch or the contact touch.

The touch sensor senses a touch (or a touch input) applied to the touch screen (or the display 151) using at least one of various touch types such as a resistive film type, a capacitive type, an infrared type, an ultrasonic type, and a magnetic field type.

For example, the touch sensor may be configured to convert a change in a pressure applied to a specific portion of the touch screen, or a capacitance generated in a specific portion, into an electrical input signal. The touch sensor may be configured to detect a position and area where a touch subject that applies a touch onto the touch screen is touched on the touch sensor, and a pressure and capacitance at the time of the touch. Here, the touch subject is an object that applies a touch to the touch sensor, and may include, for example, a finger, a touch pen, a stylus pen, and a pointer.

As described above, when there is the touch input to the touch sensor, corresponding signal(s) is transmitted to a touch controller. The touch controller processes the signal(s) and then transmits corresponding data to the controller 180. By doing this, the controller 180 may confirm which area of the display 151 is touched. Here, the touch controller may be a separate component from the controller 180, or may be the controller 180 itself.

The controller 180 may perform different control or the same control depending on a type of a touch subject that touches the touch screen (or a touch key provided other than the touch screen). Whether to perform the different or the same control depending on the type of touch subject may be determined in accordance with an operating state of the current mobile terminal 100 or an application program that is being executed.

The touch sensor and the proximity sensor that are described above may, independently or in combination, sense various types of touches on the touch screen, such as a short (or tap) touch, a long touch, a multi touch, a drag touch, a flick touch, a pinch-in touch, a pinch-out touch, a swipe touch, or a hovering touch.

The ultrasonic sensor may recognize position information on a sensing object using an ultrasonic wave. The controller 180 may calculate a position of a wave generating source by using information sensed by the optical sensor and the plurality of ultrasonic sensors. The position of the wave generating source may be calculated using the property that light is much faster than the ultrasonic wave, that is, the time in which light reaches the optical sensor is much faster than the time in which the ultrasonic wave reaches the ultrasonic sensor. More specifically, the position of the wave generating source may be calculated using a time difference of the time of arrival of the ultrasonic wave with respect to light that serves as a reference signal.

As seen from the configuration of the input interface 120, the camera 121 includes at least one of a camera sensor (for example, a CCD and a CMOS), a photo sensor (or an image sensor), or a laser sensor.

The camera 121 and the laser sensor may be combined to sense a touch of a sensing object for a three-dimensional stereoscopic image. The photo sensor, which may be stacked on a display element, is configured to scan a motion of the sensing object proximate to the touch screen. More specifically, the photo sensor includes photo diodes and transistors (TR) in rows/columns so as to scan contents disposed on the photo sensor by using an electrical signal that changes in accordance with an amount of light applied to the photo diode. That is, the photo sensor calculates coordinates of the sensing object in accordance with a changed amount of light, and position information on the sensing object may be obtained through the coordinates.

The display 151 displays (outputs) information processed in the mobile terminal 100. For example, the display 151 may display execution screen information on an application program driven in the mobile terminal 100 and user interface (UI), or graphic user interface (GUI) information in accordance with the execution screen information.

Further, the display 151 may be configured as a stereoscopic display that displays a stereoscopic image.

A three-dimensional display type such as a stereoscopic type (a glass type), an autostereoscopic type (a glass-free type), and a projection type (a holographic type) may be applied to the stereoscopic display.

The sound output interface 152 may output audio data received from the wireless transceiver 110 or stored in the memory 170 in, for example, a call signal reception mode, a phone-call mode, a recording mode, a voice recognition mode, and a broadcasting reception mode. The sound output interface 152 may also output a sound signal (for example, a call signal reception sound and a message reception sound) related to a function performed in the mobile terminal 100. Such a sound output interface 152 may include, for example, a receiver, a speaker, and a buzzer.

The haptic module 153 may generate various tactile effects that the user may feel. A representative example of the tactile effect generated by the haptic module 153 may be vibration. For example, an intensity and pattern of the vibration generated in the haptic module 153 may be controlled by the selection of the user or a setting of the controller 180. For example, the haptic module 153 may compose different vibrations to output the composed vibrations, or sequentially output the different vibrations.

In addition to the vibration, the haptic module 153 may generate various tactile effects, such as effects by, for example, a pin arrangement that vertically moves to a contact skin surface, an injection force or a suction force of air through an injection port or a suction port, grazing on a skin surface, electrode contact, and stimulation of an electrostatic force or effects of reproducing a cold or hot sensation using a heat absorbing or heat emitting element.

The haptic module 153 may not only transmit a tactile effect by means of direct contact, but may also be implemented to allow the user to feel a tactile effect by muscular sensation of a finger or an arm. Two or more haptic modules 153 may be provided in accordance with a configuration aspect of the mobile terminal 100.

The optical output interface 154 outputs a signal for notifying occurrence of an event by using light from a light source of the mobile terminal 100. Examples of events generated in the mobile terminal 100 may include message reception, call signal reception, missed call, alarm, schedule notification, email reception, and information reception through an application.

The signal outputted from the optical output interface 154 is implemented as the mobile terminal emits single color or a plurality of color light on a front surface or a rear surface. When the mobile terminal senses the event confirmation of the user, the signal output may be completed.

The interface 160 serves as a passage with all external devices that are connected to the mobile terminal 100. The interface 160 receives data from the external device or is supplied with power from the external device to supply power to each component in the mobile terminal 100, or transmits data in the mobile terminal 100 to the external device. For example, the interface 160 may include, for example, a wired/wireless headset port, an external charger port, a wired/wireless data port, a memory card port, a port that connects a device equipped with an identification module, an audio input/output (I/O) port, a video input/output (I/O) port, and an earphone port.

The identification module is a chip in which various pieces of information for authenticating a usage right of the mobile terminal 100 is stored, and may include, for example, a user identity module (UIM), a subscriber identity module (SIM), and a universal subscriber identity module (USIM). A device (hereinafter, referred to as "identification device") equipped with the identification module may be manufactured as a smart card. Therefore, the identification device may be connected to the terminal 100 through the interface 160.

When the mobile terminal 100 is connected to an external cradle, the interface 160 may serve as a passage through which power is supplied from the cradle to the mobile terminal 100 or a passage through which various command signals inputted to the cradle by a user are transmitted to the mobile terminal 100. Various command signals or power inputted from the cradle may operate a signal for recognizing that the mobile terminal 100 is precisely mounted in the cradle.

The memory 170 may store a program for an operation of the controller 180, or temporarily store inputted/outputted data (for example, a phone book, a message, a still image, and a moving image). The memory 170 may store data related to vibrations or sounds of various patterns outputted when the touch is inputted onto the touch screen.

The memory 170 may include at least one type of storage medium of a flash memory type, a hard disk type, a solid state disk (SSD) type, a silicon disk drive (SDD) type, a multimedia card micro type, and card type memories (for example, SD or XD memory), a random access memory (RAM), a static random access memory (SRAM), a read-only memory (ROM), an electrically erasable programmable read-only memory (EEPROM), a programmable read only memory (PROM), a magnetic memory, a magnetic disk, or an optical disk. The mobile terminal 100 may operate in association with a web storage that performs a storage function of the memory 170 on the Internet.

As described above, the controller 180 may control an operation related to the application program and an overall operation of the mobile terminal 100. For example, when the state of the mobile terminal satisfies a predetermined condition, the controller 180 may execute or release a locking state that restricts an input of a control command of a user regarding the applications.

Further, the controller 180 may perform control and processing related to, for example, voice call, data communication, and video call, or may perform a pattern recognition process that may recognize a handwriting input or a picture drawing input performed on the touch screen as a text or an image, respectively. Moreover, the controller 180 may control any one or a combination of a plurality of components described above to implement various embodiments which will be described below, in the mobile terminal 100 according to the present disclosure.

Under the control of the controller 180, the power supply 190 is supplied with an external power or an internal power, and supplies power required for operating the components. The power supply 190 includes a battery, and the battery may be a chargeable embedded battery and be detachably coupled to a terminal body to be charged.

Further, the power supply 190 may include a connection port, and the connection port may be configured as one example of an interface 160 to which an external charger which supplies power to charge a battery is electrically connected.

As another example, the power supply 190 may be configured to wirelessly charge the battery without using the connection port. In this case, the power supply 190 may receive power from an external wireless power transmission device by using one or more of an inductive coupling scheme based on a self-induction phenomenon or a magnetic resonance coupling scheme based on an electromagnetic resonance phenomenon.

Various embodiments below may be implemented in a recording medium readable by a computer or a similar device using hardware, software, or a combination thereof, for example.

The display 151 displays (outputs) information processed in the mobile terminal 100. For example, the display 151 may display execution screen information on an application program driven in the mobile terminal 100 and user interface (UI), or graphic user interface (GUI) information in accordance with the execution screen information.

The display 151 may include at least one of a liquid crystal display (LCD), a thin film transistor liquid crystal display (TFT LCD), an organic light emitting diode (OLED), a flexible display, a three-dimensional display (3D display), or an electronic ink display (e-ink display).

Further, two or more displays 151 may be provided in accordance with an implementation type of the mobile terminal 100. In this case, a plurality of displays may be disposed to be spaced apart from each other or integrally disposed on one surface of the mobile terminal 100 or may be disposed on different surfaces.

The display 151 may include a touch sensor that senses a touch on the display 151 so as to receive the control command by the touch method. Therefore, when the touch is made on the display 151, the touch sensor senses the touch, and based on the touch, the controller 180 may generate a control command corresponding to the touch. Contents inputted by the touch method may be, for example, letters or numbers, or instructions or designated menu items in various modes.

The microphone 122 is configured to receive a voice of the user, or other sounds. The microphone 122 may be provided in a plurality of locations to receive stereo sounds.

The interface 160 serves as a passage through which the mobile terminal 100 is connected to the external device. For example, the interface 160 may be at least one of a connection terminal for connection with other devices (for example, an earphone or an external speaker), a port for near field communication (for example, an infrared port (IrDA port), a Bluetooth port, and a wireless LAN port) or a power supply terminal for supplying power to the mobile terminal

100. The interface 160 may be implemented as a socket type which accommodates an external card, such as a subscriber identity module (SIM), a user identity module (UIM), and a memory card for information storage.

At least one antenna for wireless communication may be provided in a terminal body. The antenna may be embedded in the terminal body or formed in a case. For example, the antenna which forms a part of the broadcast receiving module 111 (see FIG. 1) may be configured to be withdrawn from the terminal body. Alternatively, the antenna may be formed to be a film type to be attached onto an inner surface of a housing, or a case including a conductive material may serve as an antenna.

The terminal body includes the power supply 190 (see FIG. 1) which supplies power to the mobile terminal 100. The power supply 190 may be embedded in the terminal body, or may include a battery 191 which is configured to be detachable at the outside of the terminal body.

The battery 191 may be configured to be supplied with power through a power cable connected to the interface 160. Further, the battery 191 may be configured to be wirelessly chargeable by a wireless charging device. The wireless charging may be implemented by a self-induction scheme or a resonance scheme (magnetic resonance scheme).

An accessory which protects an outer appearance of the mobile terminal 100 or supports or extends the function thereof may be added to the mobile terminal 100. An example of the accessory may include a cover or a pouch which covers at least one surface of the mobile terminal 100 or accommodates the mobile terminal 100. The cover or the pouch may interwork with the display 151 to extend the function of the mobile terminal 100. Another example of the accessory may include a touch pen which supports or extends a touch input on the touch screen.

The display device 1 according to the embodiment of the present disclosure includes a flexible display 300 which is transformable by an external force.

The transformation may be at least one of warping, bending, folding, twisting, rolling, and spreading of the display module. The transformable display module may be referred to as a "flexible display". Here, the flexible display 300 may include a general flexible display, an electronic paper (e-paper), and a combination thereof.

A general flexible display 300 refers to a durable display which maintains characteristics of existing flat panel displays, and is manufactured on a thin and flexible substrate which can be warped, bent, folded, twisted, rolled, and spread like paper, is light in weight, and is not easily broken.

Further, electronic paper is a display technique to which characteristic of general ink are applied, but uses reflection light, which is different from existing flat panel displays. The electronic paper may change information using a twist ball or electrophoresis using a capsule.

Information displayed on the flexible display 300 may include visual information that is outputted on a curved surface. The visual information is implemented by independently controlling the light emission of unit pixels (sub pixels) disposed in a matrix. A unit pixel refers to a minimum unit which implements one color.

A part of the flexible display 300 may be not flat but may be bent. In this case, when an external force is applied to the flexible display 300, a part of the flexible display 300 may be deformed into a flat state, or a less bent state or a more bent state.

The flexible display 300 may be combined with a touch sensor to implement a flexible touch screen. When a touch is made on the flexible touch screen, the controller 180 (see FIG. 1) performs control corresponding to the touch input. The flexible touch screen is formed such that the touch input is sensed while a part of the flexible display 300 is spread or bent.

The display device 1 according to the modified example may include a deformation sensing means which senses deformation of the flexible display 300. The deformation sensing means may be included in the sensor 140 (see FIG. 1).

The deformation sensing means may be provided in the flexible display 300 or the body 200, and may sense information related to the deformation of the flexible display 300. Here, the information related to the deformation may be information on a deformation direction of the flexible display 300, information on how much the flexible display 300 is deformed, information on the position of the deformation, information on the time of the deformation, information on an acceleration at which the deformed flexible display 300 is restored, and the like. In addition to the above information, various other types of information which can be sensed due to the bending of the flexible display 300 may also be included.

Further, the controller 180 (see FIG. 1) may change information disposed on the flexible display 300 or generate a control signal for controlling a function of the display device 1, based on the information related to the deformation of the flexible display 300 sensed by the deformation sensing means.

The deformation of the state of the flexible display 300 is not limited to the deformation by the external force. For example, when a part of the flexible display 300 is unfolded, the part may be deformed to be bent by the command of the user or an application.

FIG. 2A is a perspective view illustrating a first state of a flexible display device 1, and FIG. 2B is a perspective view illustrating a second state in which the flexible display device 1 illustrated in FIG. 2A is transformed.

FIG. 3A is a rear view illustrating the flexible display device 1 of FIG. 2A, and FIG. 3B is a rear view illustrating the flexible display device 1 illustrated in FIG. 2B. In FIGS. 3A and 3B, a flexible display 300 is indicated by dotted lines.

The flexible display device 1 includes a body 200 and a flexible display 300. The body 200 may include a first body 200a, a second body 200b, and a support 240.

In describing embodiments of the present disclosure, the first direction (the X direction), the second direction (the Y direction), and the third direction (the Z direction) indicated in the drawings are directions orthogonal to each other, respectively.

The flexible display device 1 may include two surfaces 1a and 1b opposite to each other. The flexible display device 1 may include a first surface 1a and a second surface 1b, and the direction in which the first surface 1a is oriented (the direction perpendicular to or substantially perpendicular to the first surface 1a) and the direction in which the second surface 1b is oriented (the direction perpendicular to or substantially perpendicular to the second surface 1b) are opposite to each other. The flexible display device 1 may be placed such that the first surface 1a is oriented in the third direction (the Z direction), and the second surface 1b is oriented in the opposite direction to the third direction (the Z direction). Assuming that the first surface 1a is the front surface of the flexible display device 1, the second surface 1b becomes the rear surface of the flexible display device 1.

Hereinafter, unless otherwise particularly specified, the forward direction of the flexible display apparatus 1 will be referred to as the third direction (the Z direction) and the rear side of the flexible display device 1 will be referred to as the opposite direction to the third direction (the Z direction).

The body 200 may form the overall shape of the display device 1. The body 200 may be configured as a frame of the display device 1. The body 200 may be made of a relatively hard material, and may include, for example, plastic, carbon fiber, metal, or a combination thereof. Other components of the display device 1 may be coupled to the body 200.

The body 200 may take various shapes capable of supporting the other components coupled thereto.

The body 200 may have a flat shape as a whole, or may have a curved shape such as a curved surface. The body 200 may be in a form in which the interior thereof is entirely filled, or may be in a form in which a portion of the interior thereof is not filled.

For example, when viewed from the front side (in the Z direction), the body 200 may be generally flat while having a generally rectangular shape.

The body 200 may be divided into two or more parts. The body 200 may include a first body 200a and a second body 200b, and the first body 200a and the second body 200b may be configured to move relative to each other (see FIGS. 2A, 2B, 3A, 3B).

The second body 200b may be configured to slide and reciprocate relative to the first body 200a. Accordingly, the second body 200b may be configured to make the total area, which is occupied by the body 200 when viewed from the front side (in the Z direction), variable.

The second body 200b may be configured to reciprocate between a first position and a second position relative to the first body 200a.

When viewed from the front side (in the Z direction), at the first position, the total area occupied by the body 200 (the area of the body 200 projected in the Z direction) is the smallest (see FIGS. 2A and 3A), and at the second position, the total area occupied by the body 200 (the area of the body 200 projected in the Z direction) may be the largest (see FIGS. 2B and 3B).

When viewed from the front side (in the Z direction), at the first position, the area in which the first body 200a and the second body 200b overlap each other may be the largest (see FIGS. 2A and 3A or the like), and at the second position, the area in which the first body 200a and the second body 200b overlap each other may be the smallest (see FIGS. 2B and 3B or the like).

The moving direction of the second body 200b relative to the first body 200a may be parallel to the first direction (the X direction).

The first body 200a may have a predetermined length in the first direction (the X direction) and may have a predetermined length in the second direction (the Y direction) orthogonal to the first direction. The first body 200a may have a predetermined length in the third direction (the Z direction) orthogonal to the first and second directions, but the length in the third direction may be sufficiently smaller than the lengths in the first and second directions. Accordingly, the first body 200a may be generally flat in the first and second directions, or may have a flat shape in the first and second directions.

The first body 200a may have a plate shape.

The second body 200b is formed to have predetermined lengths in the first direction and the second direction. The second body 200b may have a predetermined length in the third direction, but the length in the third direction may be sufficiently smaller than the lengths in the first and second directions. Accordingly, the second body 200b may be generally flat in the first and second directions, or may have a flat shape in the first and second directions.

The second body 200a may have a plate shape.

The first body 200a and the second body 200b may be configured in plate shapes parallel to each other.

The support 240 may be coupled to, provided on, or fixed to the second body 200b. The supporter 240 moves together with the second body 200b relative to the first body 200a (see FIGS. 10A, 11A, and 11B).

The support 240 may be provided inside the flexible display device 1.

The support 240 allows the flexible display 300 to be bent to change its direction. That is, the flexible display 300 provided in the first direction may be bent while forming a curved surface on the support 240 and may extend in the opposite direction to the first direction while passing through the support 240.

The support 240 may provide a U-shaped or C-shaped path on which the flexible display 300 moves, or may support the inner surface of the flexible display 300.

When the support may be configured to support the inner surface of the flexible display 300, the support 240 may be elongated in the second direction (the Y direction).

At least a portion of the support 240 may have a constant cross section in the second direction (the Y direction). An outer peripheral surface of the support 240 that faces or is in contact with the flexible display 300 may provide a curved surface, and the supporter 240 may have a circular cross section, a semicircular cross section, or the like.

In an exemplary embodiment, the support 240 may have a cylindrical shape with a constant cross section in the second direction (the Y direction). In addition, the support 240 may be configured in the form of a roller rotatable in both directions about a central axis 241 parallel to the second direction. That is, the support 240 may be coupled to the second body 200b to be rotatable using the central axis 241 as a rotating axis (see FIG. 10A).

FIG. 4A is a perspective view illustrating the flexible display 300 separated from the flexible display device 1 in the first state, and FIG. 4B is a perspective view illustrating the flexible display 300 of FIG. 4A in a transformed state (in the second state).

FIG. 4A may correspond to the state at the first position described above, and each of FIGS. 4B and 4C may correspond to the state at the second position described above.

The flexible display 300 is made in the form of a thin film, and includes an outer surface and an inner surface. The outer surface of the flexible display 300 is a surface directed outward of the flexible display device 1, and an inner surface of the flexible display 300 is a surface directed inward of the flexible display device 1. An image is displayed on at least a portion of the outer surface of the flexible display 300.

The flexible display 300 configured to be at least partially bent is configured such that its shape is transformed when the second body 200b moves relative to the first body 200a. When transformation is performed from the first position to the second position, the flexible display 300 may be deformed in shape as the middle portion thereof is placed on the support 240 and pushed by the support 240.

The flexible display 300 may include a first region 310 and a second region 320, which are connected to each other.

The flexible display 300 may include a first region 310, a second region 320, and a third region 330, which are sequentially connected to each other.

When the flexible display 300 is not coupled to the body 200 and spreads to be flat as a whole, all of the first region 310, the second region 320, and the third region 330 may be coplanar with each other.

In FIG. 2B, dotted lines are imaginary lines indicating the boundary between the first region 310 and the second region 320 (a first connection region 321), the boundary between the first region 310 and a fourth region 340, and the boundary between a first connection region 321 and a second connection region 322.

The first region 310 may have a predetermined area and may be coupled to the body 200 from one side of the body 200. The first region 310 may be coupled to the first body 200a and fixed to the first body 200a. That is, the first region 310 may be configured such that there is no relative movement relative to the first body 200a.

The first region 310 may be parallel to the first direction and the second direction. The first region 310 may be fixed in front of the first body 200a. The first region 310 may be fixed in front of the first body 200a in the third direction. The first region 310 and the first body 200a may be coupled to be parallel to each other.

In an exemplary embodiment of the present disclosure, the first region 310 may have a generally curved surface. At this time, the curvature of the first region 310 may be smaller than the curvature of the first connection region 321 to be described later, and the radius of curvature of the first region 310 may be greater than the radius of curvature of the first connection region 321. The radius of curvature of the first region 310 may be sufficiently larger than the radius of curvature of the first connection region 321. For example, when the radius of curvature of the first connection region 321 is a, the radius of curvature of the first region 310 may be 10*a or more.

In another exemplary embodiment of the present disclosure, the first region 310 may be provided as a flat surface as a whole. The first region 310 may form a planar outer surface and may be disposed on the front surface of the body 200. The first region 310 may have a constant cross section in the first direction and the second direction.

Hereinafter, in the flexible display device 1, the first region 310 will be described on the assumption that the first region is provided as a flat surface.

A direction in which the first region 310 is oriented (a direction in which an outer surface of the first region 310 is oriented) may be the third direction. The first region 310 may form all or part of the first surface 1a of the flexible display device 1.

The flexible display 300 may further include a fourth area 340.

The fourth region 340 may extend from the first region 310 as an end portion of the flexible display 300. The fourth region 340 may have a constant cross section in the second direction and may form a curved surface, and an image may be displayed on the fourth region 340.

The second region 320 extends from the first region 310, and a portion thereof is placed on the support 240 to be bent. The second region 320 may have a constant cross section in the second direction.

A portion of the second region 320 is bent in a semicircular shape, and the bent position of the second region 320 is changed according to the movement of the second body 200b. At the first position, the first connection region 321 is curved in a semicircular shape, and at the second position, a portion of the second connection region 322 is curved in a semicircular shape.

The second region 320 may include a first connection region 321 and a second connection region 322.

The first connection region 321 may be directly connected to the first region 310, and the second connection region 322 may be directly connected to the first connection region 321 and the third region 330.

At the first position, the first connection region 321 is placed along the outer peripheral surface of the support 240 to form a curved surface. At the first position, the first connection region 321 may form a curved outer surface about a center line of curvature L1. The center line of curvature L1 is an imaginary straight line forming the center of curvature of the first connection region 321 at the first position, and is parallel to the second direction.

At the first position, the first connection region 321 may form a semicircular shape in cross section.

The center line of curvature L1 may coincide with the central axis 241 of the support 240.

At the second position, the center line of curvature L1 may be the center of curvature of the second connection region 322 forming a curved surface.

An image may be displayed on the first connection region 321 and the first region 310.

The area of the first region 310 may be larger than that of the first connection region 321.

At the first position, the second connection region 322 may form the outer surface, which is the opposite surface of the first region 310. That is, when the first region 310 is oriented in the third direction (the Z direction) at the first position, the second connection region 322 may be oriented in the opposite direction to the third direction (the Z direction). An image may be displayed on the second connection region 322.

The second connection region 322 may have a constant cross section in the second direction. At the first position, the second connection region 322 may have a constant cross section in the first direction.

The flexible display 300 is configured to be connected in the order of the first region 310, the first connection region 321, and the second connection region 322, and at the first position, the first region 310, the first connection region 321, and the second connection region 322 may form a U-shape as a whole.

In an exemplary embodiment of the present disclosure, at the first position, the second connection region 322 may form a curved surface as a whole. At this time, the curvature of the second region 322 may be smaller than the curvature of the first connection region 321, and the radius of curvature of the second region 322 may be greater than the radius of curvature of the first connection region 321. The radius of curvature of the second connection region 322 may be sufficiently larger than the radius of curvature of the first connection region 321. For example, when the radius of curvature of the first connection region 321 is a, the radius of curvature of the second connection region 322 may be 10*a or more.

In another exemplary embodiment of the present disclosure, at the first position, the second connection region 322 may be provided as a flat surface as a whole. In addition, the second connection region 322 may be parallel to the first region 310. The following description will be made in the assumption that, in the flexible display device 1, at the first position, the second connection region 322 is provided a flat surface and is parallel to the first region 310.

The third region 330 extends from the second region 320 at the opposite side to the first region 310. The third region 330 may extend from the second connection region 322 as an end portion of the flexible display 300.

In the flexible display 300, the first region 310, the second region 320, and the fourth area 340 may be configured to display an image on the surfaces thereof, and the third region 330 may be configured such that no image is displayed on the surface thereof. In the flexible display 300, the third region 330 may configure an extension portion of the display substrate, and may configure a dummy portion on which no image is displayed.

The third region 330 may be configured separately from the flexible display 300 and then coupled to the flexible display 300, or may be configured integrally with the flexible display 300 during the manufacturing process of the flexible display 300. The third region 330 may be configured with a substrate of the flexible display 300.

The third region 330 may be fabricated in the form of a plastic film, and may be configured to be flexibly bent.

The camera 121 is fixed to the rear surface of the body 200. The camera 121 may be coupled to the body 200 to be oriented in the opposite direction to the third direction (the Z direction).

The camera 121 may be fixed to the rear surface of the first body 200a.

The camera 121 may be fixed to the body 200 on the side facing away from the support 240. That is, when the support 240 is coupled to the body 200 to be biased toward the lower side of the flexible display device 1, the camera 121 is coupled to the body 200 to be biased toward the upper side of the flexible display device 1. The camera 121 may be fixed adjacent to the edge of the first body 200a that is furthest from the support 240.

Two or more cameras 121 may be provided and arranged in the second direction.

The first body 200a may include a first edge 205.

The first edge 205 is one rim of the flexible display device 1. The first edge 205 may form one side of the flexible display device 1 having a rectangular shape.

When inner edges (a first inner edge 210 and a second inner edge 220) form the left and right rims of the first body 200a, the first edge 205 may form an upper rim of the first body 200a.

The first edge 205 is fixed to the first body 200a. The first edge 205 may be configured integrally with the first body 200a or may be configured separately from the first body 200a and fixed to the first body 200a.

The first edge 205 is elongated in the second direction (the Y direction).

At least a portion of the first edge 205 may have a constant cross section in the second direction (the Y direction). The first edge 205 may have a convexly curved outer surface, and the cross section thereof may have a semicircular shape or the like.

The fourth region 340 may be fixed to the first edge 205.

The second body 200b may include a second edge 206.

The second edge 206 configures a rim of the flexible display device 1 at the opposite side to the first edge 205. When the first edge 205 configures the upper rim of the flexible display device 1, the second edge 206 configures a lower rim.

The second edge 206 is disposed outside the support 240.

A gap 207 is provided between the second edge 206 and the support 240, and the flexible display 300 forming a curved surface moves through the gap 207 (see FIGS. 11A and 11B).

When the flexible display device 1 includes a support bar 370, a connection arm 373 of the support bar 370 may move through the gap 207.

The second edge 206 is fixed to the second body 200b. The second edge 206 may be configured integrally with the second body 200b or may be configured separately from the second body 200b and fixed to the second body 200b.

The second edge 206 is elongated in the second direction (the Y direction).

At least a portion of the second edge 206 may have a constant cross section in the second direction (the Y direction). The second edge 206 may have a convexly curved outer surface, and the cross section thereof may have a semicircular shape or the like.

FIGS. 5A and 5B are views for describing a coupling relationship between rolling balls 510 and 520 and rolling recesses 211 and 221, in which internal features of the flexible display device 1 are illustrated. FIG. 5A illustrates a first state, and FIG. 5B illustrates a second state.

FIG. 6 is a cross-sectional view taken along line A-A' of FIG. 2A, and FIGS. 7A and 7B are cross-sectional views each illustrating a portion of the flexible display device 1 according to another exemplary embodiment.

FIGS. 8A and 8B are side views each illustrating the flexible display device 1 of FIG. 2B.

The flexible display device 1 includes a plurality of rolling balls and rolling recesses.

The rolling balls and the rolling recesses are combined with each other. In this case, one rolling recess and a plurality of rolling balls are combined with each other.

When the rolling balls is coupled to the first body 200a, rolling recesses are provided in the second body 200b, and when the rolling balls are coupled to the second body 200b, the rolling recesses are formed in the first body 200a.

That is, the rolling balls are coupled to one of the first body 200a and the second body 200b and the rolling recesses are provided in the other one of the first body 200a and the second body 200b.

The rolling balls 510 and 520 are configured to be rollable. The rolling balls 510 and 520 may have a spherical shape, and are spaced apart from each other and arranged in the first direction. Each of the rolling balls 510 and 520 may be rotatably coupled to the first body 200a or the second body 200b. The rolling balls 510 and 520 may have the same size and shape as each other.

The rolling recesses 211 and 221 are may be elongated in the first direction, and may be provided in the form of a concave groove and having a constant cross section in the first direction. The rolling balls 510 and 520 are partially inserted into and come into contact with the rolling recesses 211 and 221, and in this state, the rolling balls 510 and 520 and the rolling recesses 211 and 221 move relative to each other.

The rolling balls 510 and 520 may move relative to the rolling recesses 211 and 221 while rolling in contact with the rolling recesses 211 and 221.

The rolling balls and the rolling recesses may be respectively provided on opposite sides of the flexible display device 1. That is, the rolling balls 510 and the rolling recess 211 forming one combination are provided on one side (e.g., the left side) of the flexible display device 1, and the rolling balls 520 and the rolling recess 221 forming the other combination is formed on the other side (e.g., the right side) of the flexible display device 1. In this case, the rolling balls includes first rolling balls 510 and second rolling balls 520, and the rolling recesses includes a first rolling recess 211 and a second rolling recess 221.

The first body 200a may include inner edges 210 and 220. The inner edges 210 and 220 form rims of the first body 200a. The rolling recesses 211 and 221 may be provided in the inner edges 210 and 220.

The inner edges includes a first inner edge 210 and a second inner edge 220. The first inner edge 210 and the second inner edge 220 may form opposite side rims of the first body 200a and be elongated in the first direction. The first inner edge 210 may be provided over the entire section of one side rim of the first body 200a, or may be provided in a partial section of the first body 200a. The second inner edge 220 may be provided over the entire section of one side rim of the first body 200a, or may be provided in a partial section of the first body 200a.

The first inner edge 210 and the second inner edge 220 may be parallel to the first direction and may have a constant cross section in the first direction. When the first inner edge 210 forms the left rim of the first body 200a, the second inner edge 220 forms the right rim of the first body 200a.

A first rolling recess 211 is provided in the first inner edge 210. The first rolling recess 211 is provided in the outer surface of the first inner edge 210. The first rolling recess 211 may be provided in the entire section of the first inner edge 210 or may be provided in a partial section of the first inner edge 210.

A second rolling recess 221 opposite to the first rolling recess 211 is provided in the second inner edge 220. The second rolling recess 221 is provided in the outer surface of the second inner edge 220. The second rolling recess 221 may be provided in the entire section of the second inner edge 220 or may be provided in a partial section of the second inner edge 220.

When the first rolling recess 211 is provided on the left side surface of the first body 200a, the second rolling recess 221 may be provided on the right side surface of the first body 200a, and the first rolling recess 211 and the second rolling recess 221 are exposed to face away from each other.

The second body 200b may include outer edges 250 and 260. The outer edges 250 and 260 form rims of the second body 200b. The outer edges 250 and 260 may be located outside the inner edges 210 and 220, and the rolling balls 510 and 520 may be coupled to the outer edges 250 and 260.

The outer edges include a first outer edge 250 and a second outer edge 260. The first outer edge 250 and the second outer edges 260 form opposite side rims of the second body 200b and may be elongated in the first direction. The first outer edge 250 and the second outer edge 260 may be parallel to the first direction and may have a constant cross section in the first direction.

The first outer edge 250 may be located outside the first inner edge 210, and among the rolling balls 510 and 520, the first rolling balls 510 may be coupled to the first outer edge 250. The first rolling balls 510 are configured to move along the first rolling recess 211.

The plurality of first rolling balls 510 may be provided in the entire section of the first outer edge 250, or may be provided in a partial section of the first outer edge 250.

The second outer edge 260 may be located outside the second inner edge 220, and among the rolling balls 510 and 520, the second rolling balls 520 may be coupled to the second outer edge 260. The second rolling balls 520 are configured to move along the second rolling recess 221.

The plurality of second rolling balls 520 may be provided in the entire section of the second outer edge 260, or may be provided in a partial section of the second outer edge 260.

The flexible display device 1 may include a first support frame 530 and a second support frame 540.

The first support frame 530 supports the first rolling balls 510 so that the first rolling balls 510 are each rollable at a fixed position of the first outer edge 250.

The first support frame 530 is provided, in the first direction, with first holes 531 having a diameter d2 smaller than the diameter d1 of the first rolling balls 510, wherein the first rolling balls 510 are inserted into the first holes 531 to protrude from the first holes 531, respectively. The first holes 531 may be spaced apart from each other at the same interval.

The first support frame 530 is located between and spaced apart from the outer surface of the first inner edge 210 and the inner surface of the first outer edge 250 and is fixed to the second body 200b.

The second support frame 540 supports the second rolling balls 520 so that the second rolling balls 520 are each rollable at a fixed position of the second outer edge 260.

The second support frame 540 is provided, in the first direction, with second holes 541 having a diameter d2 smaller than the diameter d1 of the second rolling balls 520, wherein the second rolling balls 520 are inserted into the second holes 541 to protrude from the second holes 541, respectively. The second holes 541 may be spaced apart from each other at the same interval.

The second support frame 540 is located between and spaced apart from the outer surface of the second inner edge 220 and the inner surface of the second outer edge 260 and is fixed to the second body 200b.

The first support frame 530 and the second support frame 540 may be configured integrally with each other.

The first rolling recess 211 may have a constant cross section in the first direction. The first rolling recess 211 may be configured to be in point contact with the first rolling balls 510, and the first rolling recess 211 may be provided in the form of a curved or angled groove. The first rolling balls 510 and the first rolling recess 211 may be in one-point contact, two-point contact, or three-point contact with each other.

The second rolling recess 221 may have a constant cross section in the first direction. The second rolling recess 221 may be configured to be in point contact with the second rolling balls 520, and the second rolling recess 221 may be provided in the form of a curved or angled groove. The second rolling balls 520 and the second rolling recess 221 may be in one-point contact, two-point contact, or three-point contact with each other.

A concave first support groove 251 may be provided in an inner surface of the first outer edge 250.

In an exemplary embodiment, one first support groove 251 may be elongated in the first direction, and may have a constant cross section in the first direction. In this case, the plurality of first rolling balls 510 may be inserted into the first support groove 251 to be spaced apart from each other.

In another exemplary embodiment, a plurality of first support grooves 251 may be provided on the first outer edge 250. In this case, the first support grooves 251 are not elongated in the first direction, but may only be provided at specific points, respectively, in the form of a concave groove. The number of first support grooves 251 may be the same as the number of first rolling balls 510, in which one first rolling ball 510 is inserted and brought into contact with each first support groove 251 (see FIGS. 5A and 5B).

A portion of the first rolling ball 510 is inserted and brought into contact with the first support groove 251, and the corresponding first rolling ball 510 is supported by the first support frame 530 to prevent the corresponding first rolling ball 510 from being separated from the corresponding first support groove 251.

The first support frame 530 supports the first rolling balls 510 such that respective first rolling balls 510 are located at specific points of the first outer edge 250.

The first support grooves 251 may be configured to be in point contact with the first rolling balls 510, respectively, and may be provided in the form of a curved or angled groove (see FIGS. 7A and 7B).

A concave second support groove 261 may be provided in an inner surface of the second outer edge 260.

In an exemplary embodiment, one second support groove 261 may be elongated in the first direction, and may have a constant cross section in the first direction. In this case, the plurality of second rolling balls 520 may be inserted into the second support groove 261 to be spaced apart from each other.

In another exemplary embodiment, a plurality of second support grooves 261 may be provided on the first outer edge 250. In this case, the second support grooves 261 are not elongated in the first direction, but may only be provided at specific points, respectively, in the form of a concave groove. The number of second support grooves 261 may be the same as the number of second rolling balls 520, in which one second rolling ball 520 is inserted and brought into contact with each second support groove 261 (see FIGS. 5A and 5B).

A portion of the second rolling ball 520 is inserted and brought into contact with the second support groove 261, and the corresponding second rolling ball 520 is supported by the second support frame 540 to prevent the corresponding second rolling ball 520 from coming off from the corresponding second support groove 261.

The second support frame 540 supports the second rolling balls 520 such that respective second rolling balls 520 are located at specific points of the second outer edge 260.

The second support grooves 261 may be configured to be in point contact with the second rolling balls 520, respectively, and may be provided in the form of a curved or angled groove (see FIGS. 7A and 7B).

As described above, when the flexible display 300 is transformed while the second body 200b moves relative to the first body 200a, the first rolling balls 510 move along the first rolling recess 211, and the second rolling balls 520 move along the second rolling recess 221, wherein the rolling balls 510 and 520 and the rolling recesses 211 and 221 are in point contact with each other. The first rolling balls 510 are prevented from moving in a direction other than the longitudinal direction of the first rolling recess 211 (the first direction), and the second rolling balls 520 are prevented from moving in a direction other than the longitudinal direction of the second rolling recess 221 (the first direction). This makes it possible to reduce a frictional force generated when the flexible display device 1 is transformed between the first position and the second position, and to prevent a movement in an unintended direction in the flexible display device 1.

FIG. 9 is a cross-sectional view taken along line B-B' of FIG. 2A.

FIG. 10A is a cross-sectional view taken along line C-C' in FIG. 2A. FIG. 10B is a cross-sectional view illustrating the inner surface side of the first outer edge 250 and the second edge 206, and FIG. 10C is a cross-sectional view illustrating the inner surface side of the second outer edge 260 and the second edge 206.

The second body 200b may include a first rear guide groove 252, a first front guide groove 253, a first connection guide groove 254, a second rear guide groove 262, a second front guide groove 263, and a second connection guide groove 264 may be included.

The first rear guide groove 252 and the first front guide groove 253 may be provided on the first outer edge 250, the second rear guide groove 262 and the second front guide groove 263 may be provided on the second outer edge 260, and the first connection guide groove 254 and the second connection guide groove 264 may be provided on the second edge 206.

The first rear guide groove 252 may provide a space inside the first outer edge 250, may have a constant cross section in the first direction, and may open inward from the rear side of the first outer edge 250.

The first front guide groove 253 may provide a space inside the first outer edge 250, may have a constant cross section in the first direction, and may open inward from the front side of the first outer edge 250. The first front guide groove 253 may be symmetric with the first rear guide groove 252.

The first connection guide groove 254 may interconnect the first rear guide groove 252 and the first front guide groove 253 while providing a semicircular space inside the second edge 206 of the second body 200b.

The first rear guide groove 252, the first connection guide groove 254, and the first front guide groove 253 are combined with each other to provide a U-shaped space, wherein these guide groves function as a rail while providing a movement path for support bars 370 (especially, first support sliders 371) to be described later.

The second rear guide groove 262 may provide a space inside the second outer edge 260, may have a constant cross section in the first direction, and may open inward from the rear side of the second outer edge 260.

The second front guide groove 263 may provide a space inside the second outer edge 260, may have a constant cross section in the first direction, and may open inward from the front side of the second outer edge 260. The second front guide groove 263 may be symmetric with the second rear guide groove 262.

The second connection guide groove 264 may interconnect the second rear guide groove 262 and the second front guide groove 263 while providing a semicircular space inside the second edge 206 of the second body 200b.

The second rear guide groove 262, the second connection guide groove 264, and the second front guide groove 263 are combined with each other to provide a U-shaped space, wherein these guide groves function as a rail while providing a movement path for support bars 370 (especially, second support sliders 372) to be described later.

The first rear guide groove 252, the first front guide groove 253, and the first connection guide groove 254 may be symmetric with the second rear guide groove 262, the second front guide groove 263, and the second connection guide 264.

FIG. 11A is a cross-sectional view taken along line D-D' in FIG. 2A. FIG. 11B is a cross-sectional view illustrating a transformed state of the flexible display device 1 of FIG. 11A.

FIG. 12A is a cross-sectional view illustrating the flexible display 300 of FIG. 11A in the separated state, and FIG. 12B is a cross-sectional view illustrating the flexible display 300 of FIG. 11B in the separated state.

The first body 200a may include a support plate 230.

The support plate 230 may have be flat, and may have the same or similar size as the first region. The first region may be stacked on the outside (front side) of the support plate 230, and the support plate 230 is configured to support the first region from the inside.

The flexible display device 1 according to an exemplary embodiment of the present disclosure may include a plurality of support bars 370.

Each of the support bars 370 is configured to support the first connection region 321 or the second connection region 322 from the inside, and the plurality of support bars 370 are sequentially arranged along the first connection region 321 and the second connection region 322.

The support bars 370 are made of a relatively hard material to support the flexible display 300, and may be made of a material such as plastic or metal.

The support bars 370 may have a trapezoidal cross section (a shape in which the width is narrowed in a direction away from the rear surface of the flexible display 300).

The support bars 370 are elongated in the second direction (the Y direction) and may each include a first support slider 371, a second support slider 372, and a connection arm 373.

The first support sliders 371 are provided as end portions of the support bars 370, respectively, at one side.

The first support sliders 371 are inserted into the first rear guide groove 252, the first connection guide groove 254, and the first front guide groove 253, and are configured to move along the space (path) provided by the first rear guide groove 252, the first connection guide groove 254, and the first front guide groove 253.

The second support sliders 372 are provided as end portions of the support bars 370, respectively, at the opposite side to the first support sliders 371.

The second support sliders 372 are inserted into the second rear guide groove 262, the second connection guide groove 264, and the second front guide groove 263, and are configured to move along the space (path) provided by the second rear guide groove 262, the second connection guide groove 264, and the second front guide groove 263.

The connection arms 373 may have a constant cross section in the second direction (the Y direction).

The connection arms 373 interconnect the first support sliders 371 and the second support sliders 372, respectively, support the inner surface of the flexible display 300, and help the first connection region 321 and the second connection region 322 to maintain a stable flat or curved state.

The support bars 370 may have a predetermined thickness so that, when the plurality of successively arranged support bars 370 provide a plane parallel to the first region 310, the second region 320 supported by the support bars 370 is stably maintained like the first region 310.

The front surfaces of the connection arms 373 and the front surface of the support plate 230 may be coplanar with each other.

The support bars 370 are able to maintain the second region 320 in a stable state. In particular, when the second region 320 is made of a touch screen and a touch input is performed thereon, the second region 320 is stably supported by the support bar 370.

The second body 200b may include a back cover 280. The back cover 280 may be provided as the rear surface of the second body 200b. The back cover 280 may be fixed to the second body 200b, or may be detachably coupled to the second body 200b. The back cover 280 may be made transparent or may be made opaque.

A portion of the flexible display 300 is located inside the back cover 280. At the first position, the second connection region 322 is located inside the back cover 280.

When the back cover 280 is made transparent, the second connection region 322 is visible from the back through the back cover 280.

FIGS. 13A and 13B are views for describing the relationship between first and second magnets 571 and 572 and a first stopper 573, and the relationship between third and fourth magnets 574 and 575 and a second stopper 576, in which the state of the inside of a portion of the flexible display device 1 is illustrated. FIG. 13A illustrates the first state, and FIG. 13B illustrates the second state.

One of the first body 200a and the second body 200b may include the first magnet 571 and the second magnet 572, and the other may include the first stopper 573.

The first magnet 571 and the second magnet 572 may be coupled to one of the first inner edge 210 and the first outer edge 250, and the first stopper 573 may be provided on the other of the first inner edge 210 and the first outer edge 250.

The first magnet 571 and the second magnet 572 may be made of an electromagnet or a permanent magnet.

The first magnet 571 and the second magnet 572 are spaced apart from each other in the first direction.

The first stopper 573 is configured to apply an attractive force to each of the first magnet 571 and the second magnet 572. The first stopper 573 may be made of a metal or a permanent magnet.

The first stopper 573 may be configured to come into contact with or approach the first magnet 571 to apply an attractive force to the first magnet 571 at the first position, and the first stopper 573 may be configured to come into contact with or approach the second magnet 572 to apply an attractive force to the second magnet 572 at the second position.

Each of the first magnet 571 and the second magnet 572 may be coupled to the first inner edge 210, wherein the first magnet 571 and the second magnet 572 may be located adjacent to opposite ends of the first rolling recess 211, respectively, while being spaced apart from each other. When the first magnet 571 is located relatively upward, the second magnet 572 may be located relatively downward.

The first stopper 573 may be coupled to the first outer edge 250.

The first rolling recess 211, the first magnet 571, and the second magnet 572 may be arranged on the same line in the first direction. The first magnet 571 and the second magnet 572 may each configure a portion of the surface of the first rolling recess 211. In addition, the first stopper 573, which has a spherical shape, is inserted into the first rolling recess 211 to move along the first rolling recess 211.

The first stopper 573 may have the same size and shape as the first rolling balls 510.

The flexible display device 1 may further include a first auxiliary stopper 573a. The first auxiliary stopper 573a may be coupled to the first outer edge 250. The first auxiliary stopper 573a may have a spherical shape, and may be inserted into the first rolling recess 211 to move along the first rolling recess 211.

The first auxiliary stopper 573a may be configured to approach or contact with the second magnet 572 when the first stopper 573 approaches or comes into contact with the first magnet 571.

The flexible display device 1 may include a third magnet 574, a fourth magnet 575, and a second stopper 576.

One of the first body 200a and the second body 200b may include the third magnet 574 and the fourth magnet 575, and the other may include the second stopper 576.

The third magnet 574 and the fourth magnet 575 may be coupled to one of the second inner edge 220 and the second outer edge 260, and the second stopper 576 may be provided on the other of the second inner edge 210 and the second outer edge 260.

Each of the third magnet 574 and the fourth magnet 575 may be an electromagnet or a permanent magnet.

The third magnet 574 and the fourth magnet 575 are spaced apart from each other in the first direction.

The second stopper 576 is configured to apply an attractive force to each of the third magnet 574 and the fourth magnet 575. The second stopper 576 may be made of a metal or a permanent magnet.

The second stopper 576 may be configured to come into contact with or approach the third magnet 574 to apply an attractive force to the third magnet 574 at the first position, and the fourth stopper 575 may be configured to come into contact with or approach the fourth magnet 575 to apply an attractive force to the fourth magnet 575 at the second position.

Each of the third magnet 574 and the fourth magnet 575 may be coupled to the second inner edge 220, wherein the third magnet 571 and the fourth magnet 572 may be located adjacent to opposite ends of the second rolling recess 221, respectively, while being spaced apart from each other. When the third magnet 574 is located relatively upward, the fourth magnet 575 may be located relatively downward.

The second stopper 576 may be coupled to the second outer edge 260.

The second rolling recess 221, the third magnet 574, and the fourth magnet 575 may be arranged on the same line in the first direction. The third magnet 574 and the fourth magnet 575 may each configure a portion of the surface of the second rolling recess 221. In addition, the second stopper 576, which has a ball shape, is inserted into the second rolling recess 221 to move along the second rolling recess 221.

The second stopper 576 may have the same size and shape as the second rolling balls 520.

The flexible display device 1 may further include a second auxiliary stopper 576a. The second auxiliary stopper 576a may be coupled to the second outer edge 260. The second auxiliary stopper 576a may have a ball shape, and may be inserted into the second rolling recess 221 to move along the second rolling recess 221.

The second auxiliary stopper 576a may be configured to approach or contact with the fourth magnet 575 when the second stopper 576 approaches or comes into contact with the third magnet 574.

Each of the first magnet 571, the second magnet 572, and the first stopper 573 may be symmetrical with each of the third magnet 574, the fourth magnet 575, and the second stop 576 (e.g., left-right symmetry).

As described above, the flexible display device 1 according to an exemplary embodiment of the present disclosure includes a first magnet 571, a second magnet 572, and a first stopper 573, and further includes a third magnet 574, a fourth magnet 575, and a second stopper 576. As a result, the second body 200b may be placed at an intended correct position relative to the first body 200a and operates stably.

In addition, the first stopper 573 is configured to move along the first rolling recess 211, and the second stopper 576 is configured to move along the second rolling recess 221. It is possible to minimize a separate space to be secured due to the addition of the first magnet 571, the second magnet 572, the first stopper 573, the third magnet 574, the fourth magnet 575, and the second stopper 576.

This makes it possible to secure a sufficient internal space 200c inside the flexible display device 1.

In an exemplary embodiment of the present disclosure, the first rolling balls 510 and the second rolling balls 520 may be made of a non-magnetic material. This makes it possible to prevent the first magnet 571 or the second magnet 572 from applying an attractive force to the first rolling balls 510 when the first rolling balls 510 move along the first rolling recess 211, and further makes it possible to prevent the third magnet 574 or the fourth magnet 575 from applying an attractive force to the second rolling balls 520 when the second rolling balls 520 move along the second rolling recess 221.

FIGS. 14A and 14B are views for describing the relationship of ball plungers 550 and 560, stopping grooves 271, 272, 273, and 274, and Hall sensors 578 and 579 of the flexible display device 1, in which the states of the inside of the flexible display device 1 is schematically illustrated. FIG. 14A illustrates the first state, and FIG. 14B illustrates the second state.

One of the first body 200a and the second body 200b may be provided with a stopping groove 271, 272, 273, or 274, a ball plunger 550 or 560 may be coupled to the other of the first body 200a and the second body 200b.

The stopping groove 271, 272, 273, or 274 is provided in the form of a concave groove. The stopping groove 271, 272, 273, or 274 may be provided in the form of a circular groove.

The ball plunger 550 or 560 may include a stopping ball, a cylinder, and a spring.

The stopping ball 551 or 561 may have a ball shape. The stopping ball is configured to be partially inserted into the stopping groove. The stopping ball may be made of a magnetic material or may include a magnetic material. The stopping ball may be made of a permanent magnet or may include a permanent magnet.

The spring 553 or 563 may be formed in various elastically deformable shapes. The spring may be configured in the form of a coil spring.

The cylinder 552 or 562 includes an inner space open to one side, and the stopping ball and the spring are accommodated in the inner space of the cylinder.

The stopping ball accommodated in the inner space of the cylinder is urged outward while being elastically supported by the spring, and partially protrudes to the outside of the cylinder. The cylinder may have an inlet slightly smaller than the diameter of the stopping ball to prevent the stopping ball from coming off.

When the first body 200a is provided with the stopping groove 271, 272, 273, or 274, the ball plunger 550 or 560 is fixed to the second body 200b (see FIGS. 14A and 14B). Alternatively, when the second body 200b is provided with the stopping groove, the ball plunger may be fixed to the first body 200a.

Depending on the relative position between the first body 200a and the second body 200b, the stopping ball of the ball plunger may be inserted into or come out from the stopping groove.

When the stopping ball is inserted into the stopping groove, unless a separate external force is applied, the engagement between the stopping ball and the stopping groove are maintained, and the relative movement between the first body 200a and the second body 200b is prevented. For example, when the stopping ball is inserted into the stopping groove, the first state or the second state is maintained unless a separate external force is applied.

When the second body 200b is moved in parallel to the first direction relative to the first body 200a in the state in which the stopping ball is inserted into the stopping groove, the spring is compressed and the stopping ball comes off from the stopping groove so that the engagement between the ball plunger and the stopping groove is released, and a relative movement is allowed between the first body 200a and the second body 200b.

A plurality of stopping grooves may be provided, and a plurality of ball plungers may also be provided.

When a plurality of stopping grooves are provided, the stopping grooves may include a first stopping groove 271 and a second stopping groove 272. The first stopping groove 271 and the second stopping groove 272 are spaced apart from each other in the first direction.

Of the ball plungers, a first ball plunger 550 may include a first stopping ball 551, a first cylinder 552, and a first spring 553. Each of the first stopping ball 551, the first cylinder 552, and the first spring 553 may be configured like the above-described stopping ball, cylinder, and spring.

The first stopping ball 551 of the first ball plunger 550 may be inserted into the first stopping groove 271 at the first position and inserted into the second stopping groove 272 at the second position.

In an exemplary embodiment, the first stopping groove 271 and the second stopping groove 272 may be provided on the first inner edge 210 and may be disposed to be spaced apart from each other in the first direction. In this case, the first ball plunger 550 may be coupled to the first outer edge 250.

The stopping groove may include a third stopping groove 273 and a fourth stopping groove 274. The third stopping groove 273 and the fourth stopping groove 274 are spaced apart from each other in the first direction.

Of the ball plungers, a second ball plunger 560 may include a second stopping ball 561, a second cylinder 562, and a second spring 563. Each of the second stopping ball 561, the second cylinder 562, and the second spring 563 may be configured like the above-described stopping ball, cylinder, and spring.

The second stopping ball 561 of the first ball plunger 560 may be inserted into the third stopping groove 273 at the first position and inserted into the fourth stopping groove 274 at the second position.

In an exemplary embodiment, the third stopping groove 273 and the fourth stopping groove 274 may be provided on the first inner edge 220 and may be disposed to be spaced apart from each other in the first direction. In this case, the second ball plunger 560 may be coupled to the second outer edge 260.

The flexible display device 1 may include a Hall sensor (Hall IC) 578 or 579. A plurality of Hall sensors 578 and 579 may be provided and arranged in the first direction. The Hall sensors 578 and 579 may be coupled to sensor boards 701 and 702.

Some of the Hall sensors 578 and 579 may be disposed at the same position as stopping grooves.

The Hall sensors 578 and 579 may be configured to detect a magnetic field generated from the stopping balls. According to a change in the relative position between respective Hall sensors 578 and 579 and the stopping balls, it is possible to identify the relative position between the first body 200a and the second body 200b, and further it is possible to identify the state of the flexible display 300.

The flexible display device 1 may include a controller 180 configured to control the flexible display 300 according to the position information of the stopping balls detected by the Hall sensors 578 and 579 (see FIG. 1).

When the stopping balls are coupled to the first body 200a, the Hall sensors 578 and 579 may be coupled to the second body 200b.

When the stopping balls are coupled to the second body 200b, the hall sensors 578 and 579 may be coupled to the first body 200a (see FIGS. 14A and 14B).

The Hall sensors 578 and 579 may include a first Hall sensor 578 and a second Hall sensor 579.

The first Hall sensor 578 may be coupled to the first inner edge 210, and the first stopping ball 551 may be coupled to the first outer edge 250. The first Hall sensor 578 may be configured to detect the magnetic field of the first stopping ball 551 and to transmit position information of the first stopping ball 551 to the controller 180.

A plurality of first Hall sensors 578 may be provided and arranged to be spaced apart from each other in the first direction.

The second Hall sensor 579 may be coupled to the second inner edge 220, and the second stopping ball 561 may be coupled to the second outer edge 260. The second Hall sensor 579 may be configured to detect the magnetic field of the second stopping ball 561 and to transmit position information of the second stopping ball 561 to the controller 180.

A plurality of second Hall sensors 579 may be provided and arranged to be spaced apart from each other in the first direction.

In an exemplary embodiment, when the first state is switched into the second state, i.e., the screen is expanded on the front side of the flexible display 300, respective Hall sensors 578 and 579 mounted on the first body 200a are capable of recognizing the positional movement of respective stopping balls mounted on the second body 200b, thereby recognizing the transformation from the first state to the second state.

When the plurality of Hall sensors 578 and 579 are arranged in the first direction on the first body 200a, the flexible display 300 is configured to be variable while the stopping balls are moving.

The controller 180 may be configured to control the above-described haptic module 153 according to the position information of the stopping balls detected by the Hall sensors 578 and 579. That is, as the second body 200b moves relative to the first body 200a, the intensity and pattern of vibration generated by the haptic module 153 may be controlled by the controller 180.

FIGS. 15A and 15B are views for describing the relationship between the stopping grooves and the ball plungers, in which the states of the inside of the flexible display device 1 are schematically illustrated. FIG. 15A illustrates the first state, and FIG. 15B illustrates the second state.

In an exemplary embodiment, the first stopping groove 271 and the second stopping groove 272 may be provided on the first outer edge 250 and may be disposed to be spaced apart from each other in the first direction. In this case, the first ball plunger 550 may be coupled to the first inner edge 210.

The flexible display device 1 may further include a first auxiliary ball plunger 550a.

The first auxiliary ball plunger 550a may be configured to be the same as the above-described ball plungers. When the first stopping ball 551 of the first ball plunger 550 is inserted into the first stopping groove 271, the stopping ball of the first auxiliary ball plunger 550a may be inserted into the second stopping groove 272.

When the first rolling recess 211 is provided on the first inner edge 210 and the first rolling ball 510 is provided on the first outer edge 250, the first stopping groove 271 and the second stopping groove 272 may be provided on the first outer edge 250 and the first ball plunger 550 and the first auxiliary ball plunger 550a may be provided on the first inner edge 210.

The first stopping groove 271 and the second stopping groove 272 may be located to be spaced apart from each other in the first direction and to be respectively adjacent to opposite ends of a series of first rolling balls 510. The first ball plunger 550 and the first auxiliary ball plunger 550a may be located to be spaced apart from each other in the first direction and to be respectively adjacent to opposite ends of the first rolling recess 211.

In an exemplary embodiment, the third stopping groove 273 and the fourth stopping groove 274 may be provided on the second outer edge 260 and may be disposed to be spaced apart from each other in the first direction. In this case, the second ball plunger 560 may be coupled to the second inner edge 220.

The flexible display device 1 may further include a second auxiliary ball plunger 560a.

The second auxiliary ball plunger 560a may be configured to be the same as the above-described ball plungers. When the second stopping ball 561 of the second ball plunger 560 is inserted into the third stopping groove 273, the stopping ball of the second auxiliary ball plunger 560a may be inserted into the fourth stopping groove 274.

When the second rolling recess 221 is provided on the second inner edge 220 and the second rolling ball 520 is provided on the second outer edge 260, the third stopping groove 273 and the fourth stopping groove 274 may be provided on the second outer edge 260 and the second ball plunger 560 and the second auxiliary ball plunger 560a may be provided on the second inner edge 220.

The third stopping groove 273 and the fourth stopping groove 274 may be located to be spaced apart from each other in the first direction and to be respectively adjacent to opposite ends of a series of second rolling balls 520. The second ball plunger 560 and the second auxiliary ball plunger 560a may be located to be spaced apart from each other in the first direction and to be respectively adjacent to opposite ends of the second rolling recess 221.

The flexible display device 1 may include auxiliary magnets, and in this case, the stopping balls may be disposed such that an attractive force acts between the stopping ball and the auxiliary magnets.

The auxiliary magnets may be electromagnets or permanent magnets.

The auxiliary magnets are fixed inside the stopping grooves, respectively.

The auxiliary magnets may include a first auxiliary magnet 581, a second auxiliary magnet 582, a third auxiliary magnet 583, and a fourth auxiliary magnet 584.

The first auxiliary magnet 581 is fixed inside the first stopping groove 271, the second auxiliary magnet 582 is fixed inside the second stopping groove 272, and the third auxiliary magnet 583 may be fixed in the third stopping groove 273, and the fourth auxiliary magnet 584 may be fixed inside the fourth stopping groove 274.

When the stopping balls are inserted into the stopping grooves, respectively, unless a separate external force acts, the engagement between the stopping balls and the stopping grooves is maintained, and the attractive force acts between the auxiliary magnets and the stopping balls, so that the relative movement between the first body 200a and the second body 200b is prevented more stably.

In addition, even if the depth of each stopping groove is relatively low, it is possible to prevent an unintended relative movement between the first body 200a and the second body 200b, and it is possible to reduce the frictional force generated in the state in which the stopping balls come off from the stopping grooves.

The flexible display device 1 may further include a first moving surface 255, a first inclined surface 256, and a second inclined surface 257.

When the first stopping groove 271 is provided in the first body 200a, the first moving surface 255, the first inclined surface 256, and the second inclined surface 257 are also provided in the first body 200a, and when the first stopping groove 271 is provided in the second body 200b, the first moving surface 255, the first inclined surface 256, and the second inclined surface 257 are also provided in the second body 200b.

In an exemplary embodiment, when the first stopping groove 271 and the second stopping groove 272 are provided on the first outer edge 250, the first moving surface 255, the first inclined surface 256, and the second inclined surface 257 are provided on the first outer edge 250.

The first moving surface 255 provides a path on which the first stopping ball 551 moves between the first stopping groove 271 and the second stopping groove 272. The first moving surface 255 may have a constant cross section in the first direction.

The first inclined surface 256 interconnects the first stopping groove 271 and the first moving surface 255 and is configured to provide an inclined surface that is closer to the first inner edge 210 as it goes toward the first stopping groove 271.

The second inclined surface 257 interconnects the second stopping groove 272 and the first moving surface 255 and is configured to provide an inclined surface that is closer to the first inner edge 210 as it goes toward the second stopping groove 272.

When a first rolling ball 510 is located on the first moving surface 255, the first rolling ball 510 may not be in contact with the first moving surface 255. Meanwhile, the compressive deformation of the first spring 553 when the first rolling ball 510 is located on the first moving surface 255 may be smaller than the compressive deformation of the first spring 553 when the first rolling ball 510 is located on the first stopping groove 271 or the second stopping groove 272. Accordingly, when the first rolling ball 510 is located on the first moving surface 255, no friction may occur between the first rolling ball 510 and the first moving surface 255 or the frictional force generated between the first rolling ball 510 and the first moving surface 255 may be minimized.

When the first rolling ball 510, the first moving surface 255, the first stopping groove 271 and the second stopping groove 272 are provided on the first outer edge 250, the first rolling ball 510 may be disposed at a position different from those of the first moving surface 255, the first stopping groove 271, and the second stopping groove 272 in the third direction (the Z direction). In addition, in the third direction (the Z direction), the first rolling ball 510 is disposed at a position different from those of the first ball plunger 550 and the first stopping ball 551, so that, when transformation is performed between the first position and the second position, the first rolling ball 510 does not interfere with the first ball plunger 550 and the first stopping ball 551.

The flexible display device 1 may further include a second moving surface 265, a third inclined surface 266, and a fourth inclined surface 267.

When the third stopping groove 273 is provided in the first body 200a, the second moving surface 265, the third inclined surface 266, and the fourth inclined surface 267 are also provided in the first body 200a, and when the third stopping groove 273 is provided in the second body 200b, the second moving surface 265, the third inclined surface 266, and the fourth inclined surface 267 are also provided in the second body 200b.

In an exemplary embodiment, when the third stopping groove 273 and the fourth stopping groove 274 are provided on the second outer edge 260, the second moving surface 265, the third inclined surface 266, and the fourth inclined surface 267 are provided on the second outer edge 260.

The second moving surface 265 forms a path on which the second stopping ball 561 moves between the third stopping groove 273 and the fourth stopping groove 274. The second moving surface 265 may have a constant cross section in the first direction.

The third inclined surface 266 interconnects the third stopping groove 273 and the second moving surface 265 and is configured to provide an inclined surface that is closer to the second inner edge 220 as it goes toward the third stopping groove 273.

The fourth inclined surface 267 interconnects the fourth stopping groove 274 and the second moving surface 265 and is configured to provide an inclined surface that is closer to the second inner edge 220 as it goes toward the fourth stopping groove 274.

When a second rolling ball 520 is located on the second moving surface 265, the second rolling ball 520 may not be in contact with the second moving surface 265. Meanwhile, the compressive deformation of the second spring 563 when the second rolling ball 520 is located on the second moving surface 265 may be smaller than the compressive deformation of the second spring 563 when the second rolling ball 520 is located on the third stopping groove 273 or the fourth stopping groove 274. Accordingly, when the second rolling ball 520 is located on the second moving surface 265, no friction may occur between the second rolling ball 520 and the second moving surface 265 or the frictional force generated between the second rolling ball 520 and the second moving surface 255 may be minimized.

When the second rolling ball 520, the second moving surface 265, the third stopping groove 273, and the fourth stopping groove 274 are provided on the second outer edge 260, the second rolling ball 520 may be disposed at a position different from those of the second moving surface 265, the third stopping groove 273, and the fourth stopping groove 274 in the third direction (the Z direction). In addition, in the third direction (the Z direction), the second rolling ball 520 is disposed at a position different from those of the second ball plunger 560 and the second stopping ball 561, so that during the transformation between the first position and the second position, the second rolling ball 520 does not interfere with the second ball plunger 560 and the second stopping ball 561.

FIG. 16 is a rear view schematically illustrating a flexible display device 1.

FIG. 17 is an exploded perspective view illustrating tension generators 400, 400a, and 400b.

The flexible display device 1 may include a tension generator 400.

The tension generator 400 may be configured to pull the flexible display 300 and cause a tensile force to be generated in the flexible display 300.

The tension generator 400 may be coupled to the body 200 and connected to the second region 320 or the third region 330 of the flexible display 300, and may be configured to increase the tension applied to the flexible display 300 during the transformation from the first position to the second position.

In an exemplary embodiment, the tension generator 400 may include a spring.

When the flexible display 300 includes the third region 330, the tension generator 400 may be configured to interconnect the first body 200a and the third region 330, and when the third region 330 approaches the support 240 in the first direction, the tension generator 400 may apply an external force to the flexible display 300 so that the third region 330 moves away from the support 240. That is, the tension generator 400 may be configured to pull the third region 330 so that the third region 330 approaches the camera 121 in the first direction.

When the flexible display 300 includes the third region 330, the tension generator 400 may be configured to interconnect the second body 200b and the third region 330, and when the third region 330 approaches the support 240 in the first direction, the tension generator 400 may apply an external force to the flexible display 300 so that the third region 330 moves away from the support 240. That is, the tension generator 400 may be configured to pull the third region 330 so that the third region 330 approaches the camera 121 in the first direction.

In the flexible display device 1, the tension generator 400 may include a first tension generator 400a and a second tension generator 400b. Each of the first tension generator 400a and the second tension generator 400b may be configured like the above-described tension generator 400.

The first tension generator 400a may be configured to interconnect the second body 200b and the third region 330 and apply a tensile force to the flexible display 300 at the second position.

The second tension generator 400b may connect the second body 200b and the third region 330 and apply a tensile force to the flexible display 300 at the second position.

Each of the tension generator 400, the first tension generator 400a, and the second tension generator 400b may include a tension body 410, a spool 420, a spiral spring 430, and a wire 440.

In addition, each of the tension generator 400, the first tension generator 400a, and the second tension generator 400b may include a tension housing 450 in which the spiral spring 430 is accommodated.

In addition, each of the tension generator 400, the first tension generator 400a, and the second tension generator 400b may include a pulley 460 on which the wire 440 is applied to change the direction of the wire 440.

The tension body 410 may be fixed to the second body 200b so as not to rotate relative to the second body 200b.

The spool 420 is rotatably coupled to the tension body 410 relative to the rotating shaft 401, and is configured such that the wire 440 is wound around the rim thereof.

The spiral spring 430 may be accommodated in the tension housing 450, wherein one end portion 431 may be fixed to the tension body 410 and the other end portion 432 may be fixed to the spool 420. Accordingly, the spool 420 is elastically supported relative to the tension body 410. That is, when an external force is applied to rotate the spool 420 relative to the tension body 410, the spiral spring 430 stores elastic energy while being elastically deformed, and when the external force is released, the spool 420 is reversely rotated relative to the tension body 410.

On end portion 441 of the wire 440 is fixed to the spool 420 so that the wire is wound, and the other end portion 442 is connected (fixed) to the third region 330. The wire 440 of the first tension generator 400a and the wire 440 of the second tension generator 400*b* are connected to the third region 330 at points spaced apart from each other.

When an external force is applied to the flexible display device 1 such that the flexible display device 1 is transformed from the first position to the second position, the third region 330 approaches the support 240 in the first direction and as the wire 440 is unwound from the spool 420, the spiral spring 430 stores elastic energy while being elastically deformed. Accordingly, a predetermined tension is applied to the flexible display 300.

When the external force applied to the flexible display device 1 is removed, the wire 440 is wound around the spool 420 again by the elastic restoring force of the spiral spring 430, and accordingly, the tension generator 400, 400*a*, or 400*b* pulls the third region 330 so that the third region 330 approaches the camera 121 in the first direction.

Although specific embodiments of the present disclosure have been described above and illustrated in the figures, it will be understood that the present disclosure is not limited to the described embodiments, and various modifications and changes can be made as other specific embodiments by a person ordinarily skilled in the art without departing from the spirit and scope of the present disclosure. Accordingly, the scope of the present disclosure should not be defined by the described embodiments, but should be defined by the technical idea described in the claims.

INDUSTRIAL APPLICABILITY

The flexible display device according to an exemplary embodiment of the present disclosure is remarkable in industrial applicability in that, when transformation is performed between the first position and the second position, the movement of the second body is facilitated due to the point contact between the rolling balls and the rolling recesses, and the external exposure of the components for the sliding movement of the second body is minimized.

The invention claimed is:

1. A flexible display device comprising:
a first body;
a second body moving between a first position and a second position in a first direction relative to the first body; and
a flexible display including a first region that is fixed in front of the first body to form a flat surface and, a first connection region that extends from the first region, and a second connection region that extends from the first connection region, wherein at the first position, the first connection region is bent to form a curved surface and the second connection region is parallel to the first region, and at the second position, the first connection region is coplanar with the first region, and a portion of the second connection region is bent to form a curved surface,
wherein a plurality of spherical rolling balls arranged in the first direction are coupled to one of the first body and the second body, and at least one rolling recess in a form of a concave groove with a constant cross section is provided in another one of the first body and the second body in the first direction such that the rolling balls move in contact with the rolling recesses,
wherein the rolling balls and the rolling recesses are combined with each other, and are respectively provided on opposite sides of the flexible display device,
wherein the first body includes:
a first inner edge, which is provided with a first rolling recess among the rolling recesses; and a second inner edge, which is provided with a second rolling recess that is opposite to the first rolling recess among the rolling recesses, and
wherein the second body includes:
a first outer edge located outside the first inner edge, wherein, among the rolling balls, first rolling balls moving along the first rolling recess are coupled to the first outer edge; and
a second outer edge located outside the second inner edge, wherein, among the rolling balls, second rolling balls moving along the second rolling recess are coupled to the second outer edge.

2. The flexible display device of claim 1, further comprising:
a first support frame in which first holes smaller than a diameter of the first rolling balls are repeatedly provided in the first direction, wherein the first rolling balls are inserted into and protrude from the first holes, respectively, and the first support frame is located between and spaced apart from an outer surface of the first inner edge and an inner surface of the first outer edge, and is fixed to the second body; and
a second support frame in which second holes smaller than a diameter of the second rolling balls are repeatedly provided in the first direction, wherein the second rolling balls are inserted into and protrude from the second holes, respectively, and the second support frame is located between and spaced apart from an outer surface of the second inner edge and an inner surface of the second outer edge and is fixed to the second body.

3. The flexible display device of claim 1, wherein the first rolling recess is configured in a form of a curved or angled groove to be in point contact with the first rolling balls, and
the second rolling recess is configured in a form of a curved or angled groove to be in point contact with the second rolling balls.

4. The flexible display device of claim 1, wherein the first outer edge includes concave first support grooves provided in an inner surface thereof,
the second outer edge includes concave second support grooves provided in an inner surface thereof,
the first support grooves are configured in a form of a curved or angled groove to be in point contact with the first rolling balls, and
the second support grooves are configured in a form of a curved or angled groove to be in point contact with the second rolling balls.

5. The flexible display device of claim 1, wherein the second body includes:
a first rear guide groove providing a space inside the first outer edge, wherein the first rear guide groove has a constant cross section in the first direction and opens inward from a rear side of the first outer edge;
a first front guide groove providing a space inside the first outer edge, wherein the first front guide groove has a constant cross section in the first direction and opens inward from a front side of the first outer edge, and the first front guide groove is symmetric with the first rear guide groove;
a semicircular first connection guide groove interconnecting the first rear guide groove and the first front guide groove;
a second rear guide groove providing a space inside the second outer edge, wherein the second rear guide groove has a constant cross section in the first direction and opens inward from a rear side of the second outer edge;

a second front guide groove providing a space inside the second outer edge, wherein the second front guide groove has a constant cross section in the first direction and opens inward from a front side of the second outer edge, and the second front guide groove is symmetric with the second rear guide groove; and a semicircular second connection guide groove interconnecting the second rear guide groove and the second front guide groove, wherein the flexible display device further comprises a plurality of support bars sequentially arranged to support the first connection region or the second connection region from inside, and wherein each of the support bars includes:

a first support slider configured to be inserted into and move in the first rear guide groove, the first connection guide groove, and the first front guide groove;

a second support slider configured to be inserted into and move in the second rear guide groove, the second connection guide groove, and the second front guide groove; and a connection arm interconnecting the first support slider and the second support slider.

6. The flexible display device of claim 5, wherein the first body includes a support plate configured to support the first region from inside, and a front surface of the connection arm and a front surface of the support plate are coplanar with each other.

7. The flexible display device of claim 1, wherein the second body includes a support that provides a curved surface around a center line of curvature that is parallel to a second direction orthogonal to the first direction, at the first position, the first connection region placed on the support to form a curved surface, and at the second position, a portion of the second connection region is placed on the support to form a curved surface.

8. The flexible display device of claim 1, further comprising:

a first magnet and a second magnet, which are spaced apart from each other in the first direction and coupled to one of the first body and the second body; and a first stopper provided in another one of the first body and the second body, wherein the first stopper is configured such that, at the first position, the first stopper comes into contact with or approach the first magnet so that an attractive force acts between the first magnet and the first stopper and at the second position, the first stopper comes into or approaches the second magnet so that an attractive force acts between the second magnet and the first stopper.

9. A flexible display device comprising:

a first body;

a second body moving between a first position and a second position in a first direction relative to the first body; and a flexible display including a first region that is fixed in front of the first body to form a flat surface and, a first connection region that extends from the first region, and a second connection region that extends from the first connection region, wherein at the first position, the first connection region is bent to form a curved surface and the second connection region is parallel to the first region, and at the second position, the first connection region is coplanar with the first region, and a portion of the second connection region is bent to form a curved surface, wherein a plurality of spherical rolling balls arranged in the first direction are coupled to one of the first body and the second body, and at least one rolling recess in a form of a concave groove with a constant cross section is provided in another one of the first body and the second body in the first direction such that the rolling balls move in contact with the rolling recesses, wherein the first body includes:

an inner edge provided with the rolling recess;

a first magnet and a second magnet coupled to the inner edge, wherein the first magnet and the second magnet are located to be spaced apart from each other and to be respectively adjacent to opposite ends of the rolling recess, and wherein the second body includes:

an outer edge located outside the inner edge, wherein the rolling balls are coupled to the outer edge; and a first stopper coupled to the outer edge, wherein the first stopper is configured to be in contact with or approach the first magnet at the first position so that an attractive force acts between the first stopper and the first magnet, and to be in contact with or approaches at the second position so that an attractive force acts between the first stopper and the second magnet.

10. The flexible display device of claim 9, wherein the rolling recess, the first magnet, and the second magnet are arranged on a same line in the first direction, and the first stopper has a spherical shape and is inserted into the rolling recess to move along the rolling recess.

11. The flexible display device of claim 1, further comprising:

a stopping ball coupled to one of the first body and the second body;

a plurality of Hall sensors configured to detect the stopping ball, wherein the Hall sensors are arranged on another one of the first body and the second body in the first direction; and a controller configured to control the flexible display according to position information of the stopping ball detected by the Hall sensors.

12. The flexible display device of claim 1, wherein one of the first body and the second body is provided with a first stopping groove and a second stopping groove in a form of a concave groove, and a first ball plunger coupled to another one of the first body and the second body and including a first stopping ball configured to be inserted into the first stopping groove at the first position and to be inserted into the second stopping groove at the second position.

13. The flexible display device of claim 1, wherein the first body includes:

a first stopping groove and a second stopping groove which provided on the first inner edge in a form of a concave groove, wherein the first stopping groove and the second stopping groove are located to be spaced apart from each other and to be respectively adjacent to opposite ends of the first rolling recess, and wherein the second body includes:

a ball plunger coupled to the first outer edge and including a stopping ball configured to be inserted into the first stopping groove at the first position and to be inserted into the second stopping groove at the second position, a cylinder in which the stopping ball is accommodated to protrude, and a spring accommodated in the cylinder to elastically support the stopping ball.

14. The flexible display device of claim 1, wherein the first body includes:

a ball plunger coupled to the first inner edge and including a stopping ball, a cylinder in which the stopping ball is accommodated to protrude, and a spring accommodated in the cylinder to elastically support the stopping ball, and wherein the second body includes:

a first stopping groove provided on the first outer edge in a form of a concave groove, wherein the stopping ball is configured to be inserted into the first stopping groove at the first position;

a second stopping groove provided on the first outer edge in a form of a concave groove and located on an opposite side from the first stopping groove about a series of the rolling balls;

a first moving surface configured to provide a path on which the stopping ball moves between the first stopping groove and the second stopping groove;

a first inclined surface interconnecting the first stopping groove and the first moving surface and configured to provide an inclined surface that approaches the inner edge as it goes toward the first stopping groove; and a second inclined surface interconnecting the second stoppling groove and the first moving surface and configured to provide an inclined surface that approaches the inner edge as it goes toward the second stopping groove.

15. A flexible display device comprising:

a first body including a first inner edge and a second inner edge configured to provide opposite rims thereof;

a second body including a first outer edge located outside the first inner edge and a second outer edge located outside the second inner edge, wherein the first outer edge and the second outer edge are configured to provide opposite rims of the second body, and the second body is configured to move relative to the first body in a longitudinal direction of the first inner edge; and a flexible display including a first region fixed in front of the first body and a second region extending from the first region and partially bent in a semicircular shape, and a bent position of the second region is changed depending on a movement of the second body, wherein the second body includes:

a plurality of first rolling balls rotatably coupled to an inner surface of the first outer edge and coupled along a longitudinal direction of the first outer edge; and a plurality of second rolling balls rotatably coupled to an inner surface of the second outer edge and coupled along a longitudinal direction of the second outer edge, and wherein the first body includes:

a first rolling recess provided on an outer surface of the first inner edge in a form of a concave groove so that the first rolling balls move while rolling; and a second rolling recess provided on an outer surface of the second inner edge in a form of a concave groove so that the second rolling balls move while rolling.

16. The flexible display device of claim 15, further comprising:

a first support frame in which a plurality of first holes smaller than a diameter of the first rolling balls are provided, wherein the first rolling balls are inserted into and protrude from the first holes, respectively, and the first support frame is located between and spaced apart from an outer surface of the first inner edge and an inner surface of the first outer edge, and is fixed to the second body; and a second support frame in which a plurality of second holes smaller than a diameter of the second rolling balls are provided, wherein the second rolling balls are inserted into and protrude from the second holes, respectively, and the second support frame is located between and spaced apart from an outer surface of the second inner edge and an inner surface of the second outer edge, and is fixed to the second body.

17. The flexible display device of claim 15, further comprising:

a first magnet and a second magnet, which are spaced apart from each other and coupled to one of the first inner edge and the first outer edge;

a first stopper provided in another one of the first inner edge and the first outer edge, wherein the first stopper is configured such that, depending on a movement of the second body, an attractive force acts between the first magnet and the first stopper or between the second magnet and the first stopper;

a third magnet and a fourth magnet, which are spaced apart from each other and coupled to one of the second inner edge and the second outer edge; and a second stopper provided on another one of the second inner edge and the second outer edge, wherein the second stopper is configured such that, depending on a movement of the second body, an attractive force acts between the third magnet and the second stopper or between the fourth magnet and the second stopper, wherein each of the first magnet, the second magnet, and the first stopper is symmetric with each of the third magnet, the fourth magnet, and the second stopper.

18. The flexible display device of claim 15, wherein one of the first inner edge and the first outer edge is provided with a first stopping groove and a second stopping groove in a form of a concave groove to be spaced apart from each other, and a first ball plunger including a first stopping ball configured to be inserted into the first stopping groove or the second stopping groove depending on a movement of the second body is coupled to another one of the first inner edge and the first outer edge, wherein one of the second inner edge and the second outer edge is provided with a third stopping groove and a fourth stopping groove in the form of a concave groove to be spaced apart from each other, a second ball plunger including a second stopping ball configured to be inserted into the third stopping groove or the fourth stopping groove depending on a movement of the second body is coupled to another one of the second inner edge and the second outer edge, and wherein each of the first stopping groove, the second stopping groove, and the first ball plunger is symmetric with each of the third stopping groove, the fourth stopping groove, and the second ball plunger.

* * * * *